US007730504B2

(12) United States Patent
Kurita et al.

(10) Patent No.: US 7,730,504 B2
(45) Date of Patent: *Jun. 1, 2010

(54) DISC CARTRIDGE

(75) Inventors: Kazuhito Kurita, Kanagawa (JP); Mikinori Matsuda, Kanagawa (JP); Takahiro Yamada, Saitama (JP); Tokio Kanada, Kanagawa (JP); Takashi Fukushima, Tokyo (JP)

(73) Assignee: Sony Corporation, Tokyo (JP)

(*) Notice: Subject to any disclaimer, the term of this patent is extended or adjusted under 35 U.S.C. 154(b) by 102 days.

This patent is subject to a terminal disclaimer.

(21) Appl. No.: 11/937,850

(22) Filed: Nov. 9, 2007

(65) Prior Publication Data

US 2008/0282279 A1 Nov. 13, 2008

Related U.S. Application Data

(62) Division of application No. 10/528,112, filed on Mar. 16, 2005, now Pat. No. 7,555,763.

(51) Int. Cl.
*G11B 23/03* (2006.01)

(52) U.S. Cl. ...................................................... 720/725

(58) Field of Classification Search .......... 720/725–744
See application file for complete search history.

(56) References Cited

U.S. PATENT DOCUMENTS 6,473,392 B2 * 10/2002 Shiomi et al. ............... 720/738
6,880,167 B2 * 4/2005 Oishi et al. ................. 720/725
7,343,612 B2 * 3/2008 Ohgi .......................... 720/738
7,555,763 B2 * 6/2009 Kurita et al. ................ 720/725

FOREIGN PATENT DOCUMENTS

| | | |
|---|---|---|
| EP | 1477984 A2 * | 11/2004 |
| JP | 04-067253 | 6/1992 |
| JP | 05-189917 | 7/1993 |
| JP | 07006493 A * | 1/1995 |
| JP | 09045033 A * | 2/1997 |
| JP | 2712813 | 10/1997 |
| JP | 11273292 A * | 10/1999 |
| JP | 2000260153 A * | 9/2000 |
| JP | 2000-331448 | 11/2000 |
| JP | 2001-229638 | 8/2001 |
| JP | 2003157640 A * | 5/2003 |
| JP | 2003196943 A * | 7/2003 |
| JP | 2005-050427 | 2/2005 |

OTHER PUBLICATIONS

Japanese Office Action dated Oct. 6, 2009.

* cited by examiner

*Primary Examiner*—William J Klimowicz
(74) *Attorney, Agent, or Firm*—K&L Gates LLP

(57) ABSTRACT

A disc cartridge is provided. The disc cartridge in which is housed an optical disc includes a main cartridge body unit, rotatably housing an optical disc, and having an aperture for a head part for exposing a part of the optical disc to outside across the inner and outer rims of the optical disc, and a shutter unit mounted for movement to this main cartridge body unit for opening/closing the aperture for the head part. A recess into which is introduced a portion of a head part of the recording and/or reproducing apparatus is formed in continuation to the aperture for the head part in a surface of the main cartridge body unit on which slides a shutter unit in an area opposite to the area of movement of the shutter unit with the aperture for the head part in-between.

5 Claims, 29 Drawing Sheets

DISC CARTRIDGE

CROSS REFERENCES TO RELATED APPLICATIONS

The present application is a divisional of U.S. patent application Ser. No. 10/528,112 filed on Mar. 16, 2005 now U.S. Pat. No. 7,555,763 WHICH WAS THE National Stage of International Application No. PCT/JP2004/010516 filed on Jul. 23, 2004 and which claims priority to Japanese Patent Application Nos. 2003-281389 and 2003-281392, filed in Japan on Jul. 28, 2003, and Japanese Patent Application Nos. 2004-140473 and 2004-140498, filed in Japan on May 10, 2004, the disclosures of which in entirety are incorporated by reference herein.

BACKGROUND

The present invention relates to a disc cartridge having a disc-shaped recording medium, such as an optical disc held therein, and to a recording and/or reproducing apparatus, employing the disc cartridge as a recording medium.

Up to now, a disc cartridge, having a disc-shaped recording medium, such as an optical disc, rotatably housed therein, which disc cartridge is loaded on a disc recording and/or reproducing apparatus, as the disc-shaped recording medium is housed therein, has been in use extensively. This sort of the disc cartridge, comprising a disc-shaped recording medium, housed in a main cartridge body unit, can be loaded on or unloaded from the disc recording and/or reproducing apparatus, with the disc-shaped recording medium in a protected state.

As this sort of the disc cartridge, such a one comprising a disc-shaped recording medium, housed for rotation in a rectangular-shaped main cartridge body unit, is in widespread use.

Meanwhile, in a disc cartridge, attempts are being made to reduce its size in keeping with the size of the disc-shaped recording medium, housed therein, with a view to reducing the size of the disc recording and/or reproducing apparatus, assuring facilitated handling of the disc cartridge, and to reducing the cartridge material and reducing the production cost.

With the disc cartridge, demand is also raised for increasing the recording capacity, in addition to reducing its size. The demand for increasing the recording capacity for the information signals may be met by increasing the recording density and by increasing the recording area provided on the disc-shaped recording medium.

Such a disc cartridge in which the cartridge size is reduced in keeping with the disc-shaped recording medium housed therein is disclosed in the Japanese Laid-Open Patent Publication H-11-353845.

With the disc cartridge, disclosed in Patent Publication 1, the size of the disc cartridge itself is reduced by having a substantially arcuate lateral surface, acting as an inserting end into the recording and/or reproducing apparatus.

The disc cartridge, disclosed in the above Publication, includes a recording and/or reproducing aperture, opened/closed by a shutter member provided to a main cartridge body unit, having an optical disc housed therein, and the optical disc is partially exposed to outside via this recording and/or reproducing aperture. The information signals are recorded and/or reproduced for the optical disc as an optical pickup of a recording and/or reproducing head part is exposed to outside the main cartridge body unit via this recording and/or reproducing aperture.

With the recording and/or reproducing apparatus, employing this disc cartridge as a recording medium, the optical pickup is moved along the radius of the optical disc, at a position spaced apart from the disc cartridge to scan the signal recording area of the optical disc with a light beam to record and/or reproduce the information signals. With the recording and/or reproducing apparatus, recording and/or reproducing the optical disc in accordance with this system, the optical pickup is moved at a position spaced apart from the disc cartridge, and hence there are imitations to reducing the thickness of the apparatus by reducing its height.

Meanwhile, in disc cartridges, used up to now, inclusive of the disc cartridge disclosed in the Japanese Laid-Open Patent Publication H-11-353845, the recording and/or reproducing aperture for exposing the signal recording area of the disc-shaped recording medium to outside is formed in a plane of the main cartridge body unit. In the case of this sort of the disc cartridge, the recording and/or reproducing head has to be moved within the range of the recording and/or reproducing aperture formed in the plane of the main cartridge body unit, in order to scan the signal recording area of the disc-shaped recording medium, with the result that the signal recording area cannot be extended efficiently up to the outer rim of the disc-shaped recording medium.

When an optical disc, in which attempts have been made for increasing the recording density, is used as a disc-shaped recording medium, an optical disc, having an objective lens of a high numerical aperture (NA), is used as a recording and/or reproducing head, for further reducing the beam diameter of a light beam scanning the signal recording area of the optical disc. With the use of this sort of the optical pickup, it is necessary for the optical pickup to be at a position close to the optical disc and, to this end, it is necessary for at least a portion of the optical pickup to be introduced into the disc cartridge. If the portion of the optical pickup intrudes into the disc cartridge, there is placed limitation to the area of possible movement of the optical pickup, such that the signal recording area cannot efficiently be extended up to the outer rim of the disc-shaped recording medium.

That is, with the conventional disc cartridge, it is difficult to enlarge the signal recording area of the disc-shaped recording medium, arranged therein, so that it is difficult to increase the recording capacity if the disc-shaped recording medium is to be reduced in size at the same time.

SUMMARY

The present invention relates to a disc cartridge, having a disc-shaped recording medium, such as an optical disc held therein, and to a recording and/or reproducing apparatus, employing this disc cartridge as a recording medium.

The present invention provides in an embodiment a disc cartridge with which the recording and/or reproducing apparatus can be reduced in thickness.

The present invention provides in an embodiment a disc cartridge with which the recording and/or reproducing apparatus may be reduced in thickness at the same time as the disc cartridge is reduced in size.

The present invention provides in an embodiment a disc cartridge with which a disc housed therein may be protected reliably.

The present invention provides in an embodiment a disc cartridge with which a shutter member for opening/closing the recording and/or reproducing aperture formed in the main cartridge body unit may be improved in strength to enable the reliable opening/closure of the recording and/or reproducing aperture.

The present invention provides in an embodiment a disc cartridge with which the recording capacity may be increased at the same time as the disc housed therein is reduced in size.

A disc cartridge according to the present invention comprises a disc, and a main cartridge body unit having the disc rotatably housed therein and including a recording and/or reproducing aperture for exposing a portion of the disc to outside across inner and outer rims of the disc, wherein an entrance part for a head unit provided to a recording and/or reproducing apparatus is formed in continuation to the recording and/or reproducing aperture, for entrance of at least a portion of the head part.

The entrance part for the head unit is an opening continuing to the recording and/or reproducing aperture.

A lateral surface of the entrance part for the head unit is an inclined surface for inhibiting abutment against the head part.

The disc cartridge according to the present invention further comprises a shutter unit for opening/closing the recording and/or reproducing aperture. The entrance part for the head unit is formed as a recess, in continuation to the recording and/or reproducing aperture, in a surface on which slides the shutter unit.

A bent part for closing the space produced between the shutter member and the entrance part for the head unit when the shutter unit has been moved to a position of closing the recording and/or reproducing aperture is formed on one side of the shutter member of the shutter unit closing the recording and/or reproducing aperture.

A recessed shutter slide part is formed in an area of a surface of the main cartridge body unit, on which slides the shutter member. The entrance part for the head unit is formed as a recess of a depth deeper than the depth of the shutter slide part.

A recording and/or reproducing apparatus according to the present invention comprises a disc, a main cartridge body unit having the disc rotatably housed therein and including a recording and/or reproducing aperture for exposing a portion of the disc to outside across inner and outer rims of the disc, a cartridge loading unit for loading a disc cartridge, including a recess continuing to the recording and/or reproducing aperture, thereon, and recording and/or reproducing means for recording and/or reproducing the information for the disc housed in the disc cartridge. When the recording and/or reproducing means is introduced via the recording and/or reproducing aperture for recording and/or reproducing the information for the disc, a portion of the recording and/or reproducing means is introduced into the recess.

The recording and/or reproducing means is composed of an objective lens and an optical block. When the objective lens is introduced via the recording and/or reproducing aperture for recording and/or reproducing the information for the disc, the optical block is introduced into the recess.

A disc cartridge according to the present invention comprises a disc, and a main cartridge body unit having the disc rotatably housed therein and including a recording and/or reproducing aperture for exposing a portion of the disc to outside across inner and outer rims of the disc. The portion of the recording and/or reproducing aperture along the outer rim of the main cartridge body unit is opened by being formed with a cut-out extending from the loading surface on a recording and/or reproducing apparatus in a direction along the thickness of the disc.

The cut-out formed in the main cartridge body unit is formed so that, when the disc cartridge is introduced into and loaded in position on the recording and/or reproducing aperture for recording and/or reproduction, the cut-out is of a height at least equal to a height as from the loading surface to the recording and/or reproducing apparatus up to a setting surface for rotation driving means for the disc.

In the present disc cartridge, the inserting lateral side of the main cartridge body unit into the recording and/or reproducing apparatus is a substantially semicircular arcuate section, having a center corresponding to the center of the disc housed in the main cartridge body unit, and a recording and/or reproducing aperture is formed facing to a lateral side of the main cartridge body unit other than the inserting lateral side arcuate in profile.

When the disc cartridge according to the present invention is loaded on the recording and/or reproducing apparatus, part of the head part for recording and/or reproducing apparatus may be located in an entrance aperture for the head part formed in continuation to the recording and/or reproducing aperture, with the consequence that the recording and/or reproducing apparatus may be reduced in size.

Since one lateral side of the entrance aperture for the head part is formed as an inclined surface section for preventing abutment against the head part, it is possible to prevent the head part from colliding against the rim of the entrance aperture, when the head part is being introduced into the entrance aperture, thus assuring stable movement of the head part such as to enable the disc to be scanned correctly by the head part.

By providing the shutter unit, adapted for closing the recording and/or reproducing aperture, the spacing between the shutter member and the recess may be closed by the bent part formed on one side of the shutter member, when the shutter unit has moved to a position of closing the recording and/or reproducing aperture, so that the recording and/or reproducing aperture may be hermetically closed to prevent dust and dirt from intruding via recording and/or reproducing aperture to assure reliable protection of the disc housed in the main cartridge body unit.

Since the entrance aperture for the head part, provided to the main cartridge body unit, is formed as a recess deeper in depth than the slide part along which slides the shutter unit, a larger proportion of the head part may intrude into the inside of the main cartridge body unit, with the consequence that the recording and/or reproducing apparatus may further be reduced in size.

With the recording and/or reproducing apparatus, according to the present invention, in which, when the recording and/or reproducing means is introduced into the recording and/or reproducing aperture for recording and/or reproducing the information for the disc, part of the recording and/or reproducing means is introduced into the recess formed in the disc cartridge, the apparatus itself may be reduced in size.

When the disc cartridge according to the present invention is loaded on the recording and/or reproducing apparatus, the recording and/or reproducing head may be located via cut-out across the inner rim and the outside of the main cartridge body unit, as a result of which the head part may scan up to the outermost area of the disc to increase the signal recording area as well as the recording capacity.

Additionally, when the disc cartridge according to the present invention is loaded on the recording and/or reproducing apparatus, the head part provided to the recording and/or reproducing apparatus may be introduced into the inside of the main cartridge body unit, as the head part is positioned as from the inner rim up to the outside of the main cartridge body unit. The result is that the head part may be brought to the proximity of the head part, such that, when an optical disc is used as a dies, an optical pickup having a high NA (numerical aperture) objective lens may be used as a head part, thus achieving a high recording density of the optical disc.

With the disc cartridge according to the present invention, the recording capacity of the disc may be increased, as the disc is reduced in size.

Additional features and advantages are described herein, and will be apparent from, the following Detailed Description and the figures.

DETAILED DESCRIPTION

Figure 1:
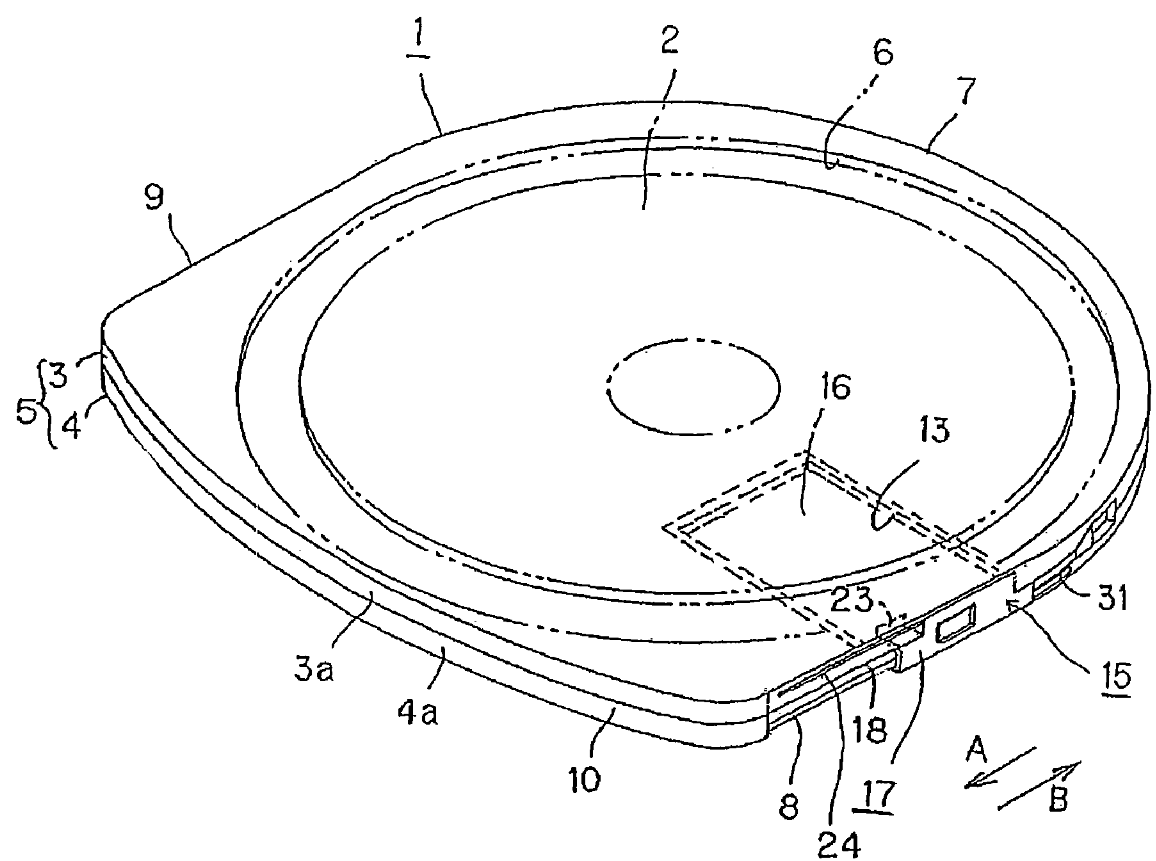
FIG. 1 is a perspective view showing a disc cartridge according to the present invention, looking from an upper cartridge half side.

The present invention relates to a disc cartridge, having a disc-shaped recording medium, such as an optical disc, held therein and to a recording and/or reproducing apparatus, employing this disc cartridge as a recording medium.

Referring now to the drawings, a disc cartridge according to the present invention is explained in detail.

Figure 2:
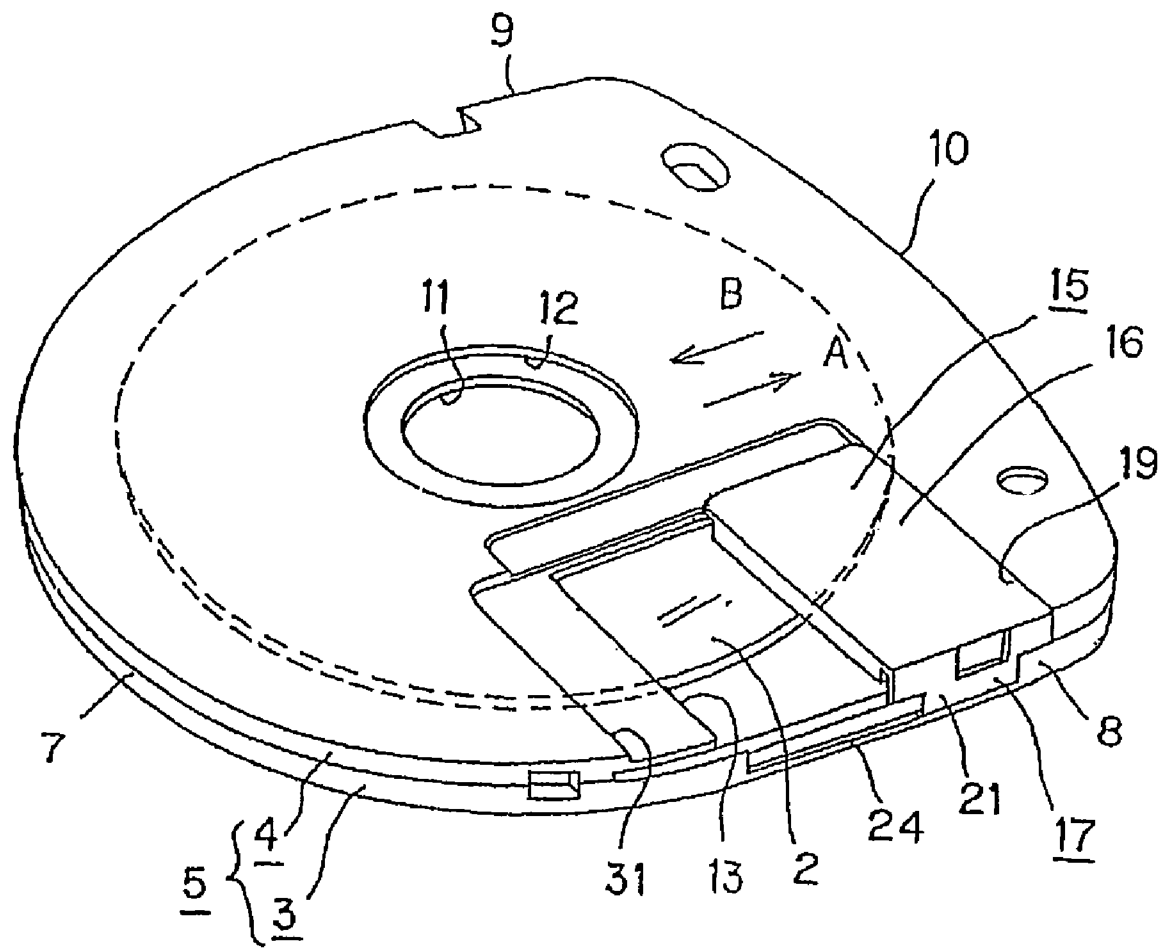
FIG. 2 is a perspective view showing a disc cartridge according to the present invention, looking from a lower cartridge half side.

A disc cartridge 1 according to the present invention houses therein an optical disc 2, as a disc-shaped recording medium, for rotation therein, and includes a main cartridge body unit 5, made up by upper and lower cartridge halves 3, 4, abutted and bonded together, as shown in FIGS. 1 and 2. The optical disc 2 is rotatably housed within this main cartridge body unit 5.

The disc cartridge 1 according to the present invention houses therein the optical disc 2, on which there are recorded program data or video data for executing e.g. a television game, and is of an extremely small size. The present disc cartridge 1 houses therein a small-sized optical disc 2 with a diameter on the order of, for example, 60 mm, and is of a size that can be held in a user's palm.

Meanwhile, the optical disc 2, housed in the present disc cartridge 1, is a replay-only disc, having information signals, such as program data, pre-recorded thereon.

The upper and lower cartridge halves 3, 4, making up a main body unit 5, housing the disc cartridge 1, is molded from a synthetic resin material, and upstanding peripheral wall sections 3*a*, 4*a* are formed on the outer rim of the halves 3, 4, respectively. The upper and lower cartridge halves 3, 4 are bonded together, with the peripheral wall sections 3*a*, 4*a* abutting to each other, thereby forming the main cartridge body unit 5 delimiting a disc housing section 6 therein. The upper and lower cartridge halves 3, 4 are bonded to each other to form the main cartridge body unit 5, by employing a welding technique, such as an ultrasonic welding technique, to welding projections formed upright on the abutting sides and on the sides of the upper and lower cartridge halves 3, 4 facing each other.

Figure 3:
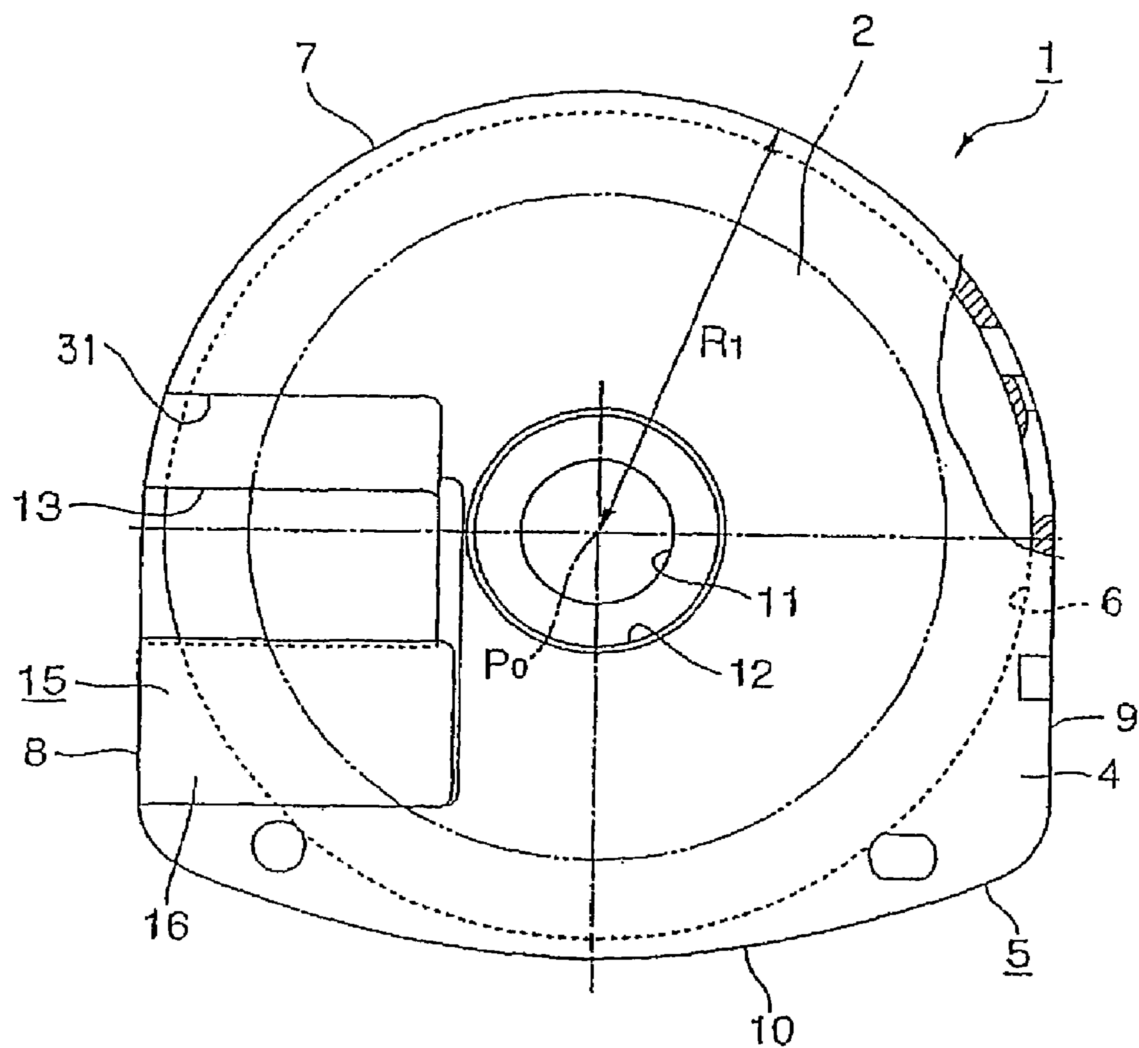
FIG. 3 is a plan view showing a disc cartridge according to the present invention, looking from a lower cartridge half side.

The main cartridge body unit 5, forming the disc cartridge 1 according to the present invention, has its front side, as an inserting side end of the disc cartridge 1 into the disc recording and/or reproducing apparatus, formed as an arcuate section 7, as shown in FIGS. 1 to 3. This arcuate section 7 is formed to a semicircle of the optical disc 2 of a radius $R_1$ housed within the disc housing section 6 of the main cartridge body unit 5, with the center of the disc as a center $P_0$ of the semicircle, as shown in FIG. 3. That is, the arcuate section 7 is formed as a semicircle commensurate with the semicircle of the optical disc 2 housed within the main cartridge body unit 5.

The opposite lateral sides of the main cartridge body unit 5, consecutive to the arcuate section 7 of the main cartridge body unit 5, are formed as sides 8, 9 parallel to each other, while the back side of the main cartridge body unit 5, lying opposite to the arcuate section 7, is formed as a uniformly smoothly curved section 10.

With the disc cartridge 1 of the present invention, the front side thereof, as an inserting side surface, is a substantially semicircular arcuate section 7 of a curvature larger than the other side, opposite thereto, so that, when the disc cartridge is inserted in the slot-in style via cartridge insertion/ejection opening, the direction of insertion into the disc recording and/or reproducing apparatus can be identified extremely readily. In particular, with the disc cartridge 1, reduced in size so as to be held in the user's palm, the direction of insertion can be identified by the sensual touch feeling, thus prohibiting mistaken insertion to enable correct loading on the disc recording and/or reproducing apparatus. Moreover, with the present disc cartridge 1, insertion into a slot-in type disc recording and/or reproducing apparatus may be facilitated, while positive insertion may be assured.

Moreover, the disc cartridge 1 may be further reduced in size, in keeping with the optical disc 2, accommodated therein, by having the inserting end side formed as a substantially semicircular arcuate section 7, and by having the back side opposite to the arcuate section 7 similarly formed as a curved section 10. At a mid part of the lower cartridge half 4, forming the lower surface of the main cartridge body unit 5, there is formed a circular center opening 12 for exposing a center hole 11 of the optical disc 2 housed in the main cartridge body unit 5, and the ambient part thereof, to outside, as shown in FIGS. 2 and 3. Into this center opening 12 intrudes a mating engagement portion, such as a turntable, of a disc rotating driving mechanism, provided to the disc recording and/or reproducing apparatus on which is loaded the disc cartridge 1.

In the lower cartridge half 4, forming the lower surface of the main cartridge body unit 5, there is formed an aperture for the head part 13, operating as a recording/reproducing aperture. The aperture for the head part 13 is provided to the lateral side 8 of the main cartridge body unit 5, and is formed as a rectangular aperture sized so as to be large enough to permit a signal recording region of the optical disc 2, accommodated in the main cartridge body unit 5, to be exposed to outside across the inner and outer rims of the disc. That is, the aperture for the head part 13 is formed for being opened in the linear flat lateral side 8 different from the front side of the main cartridge body unit 5 carrying the arcuate section 7.

A shutter unit 15 for opening/closing the aperture for the head part 13 is movably mounted to the disc cartridge 1. The shutter unit 15 includes a flat-plate-shaped shutter member 16 of a rectangular shape large enough to close the aperture for the head part 13 and a retention part 17 of a U-shaped cross-section formed at the proximal side of the shutter member 16.

The shutter member 15 is formed by punching and warping a thin metal sheet or by shaping a synthetic resin material.

Figure 4:
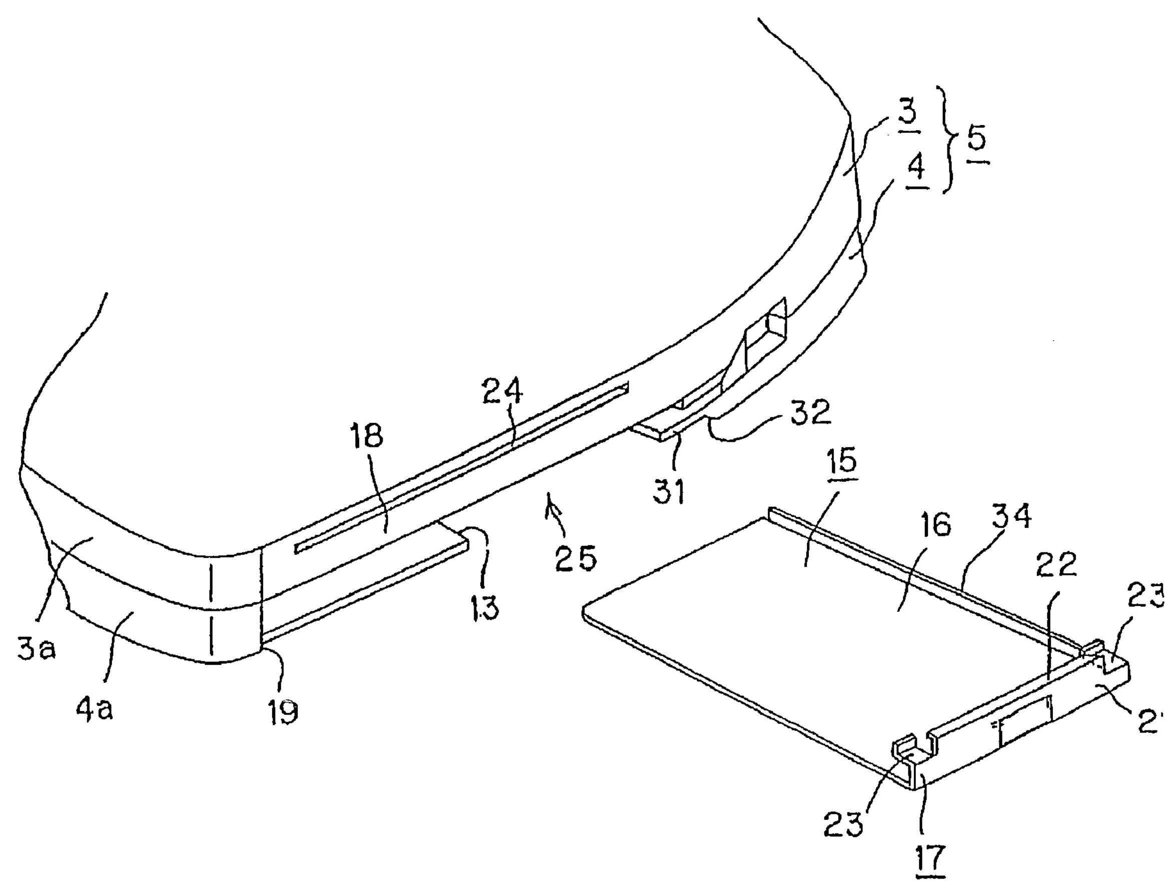
FIG. 4 is a perspective view showing a shutter unit and a main cartridge body unit carrying this shutter unit.

The shutter unit 15 is designed so that the upper cartridge half 3 of the cartridge body unit 5 is carried by the retention part 17, so that the shutter unit is movable in the directions indicated by arrows A and B for opening/closing the aperture for the head part 13. That is, the shutter unit 15 is mounted for movement on the main cartridge body unit 5, by a slide guide 18 being carried by the retention part 17, as shown in FIG. 4. The slide guide 18 is formed by a portion of an upstanding peripheral wall section 3*a* of the upper cartridge half 3.

Referring to FIG. 4, the retention part 17, provided to the shutter unit 15, is formed with a connecting piece 21, upstanding from the proximal end of the shutter unit 16, and a first engagement piece 22, bent towards the shutter unit 16, is provided to the distal end of the connecting piece 21. On both sides of the connecting piece 21, a second engagement piece 23, bent to an L-shape, is formed at a lower position than the first engagement piece 22. Meanwhile, the second engagement piece 23 is bent to an L-shape so that its distal end is protruded towards the first engagement piece 22.

Figure 5:
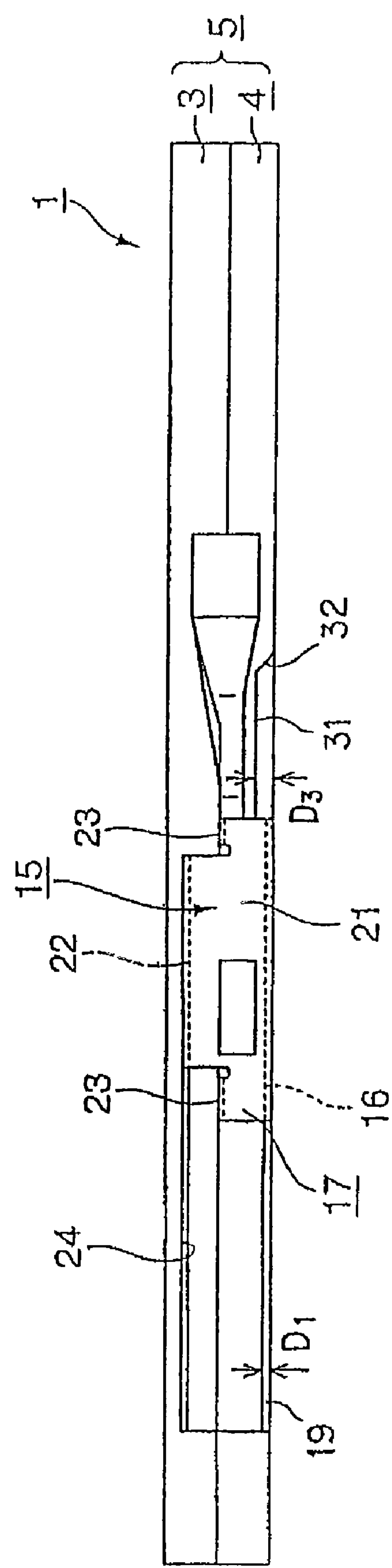
FIG. 5 is a side view showing the lateral side of the disc cartridge of the present invention carrying the shutter member.
Figure 6:
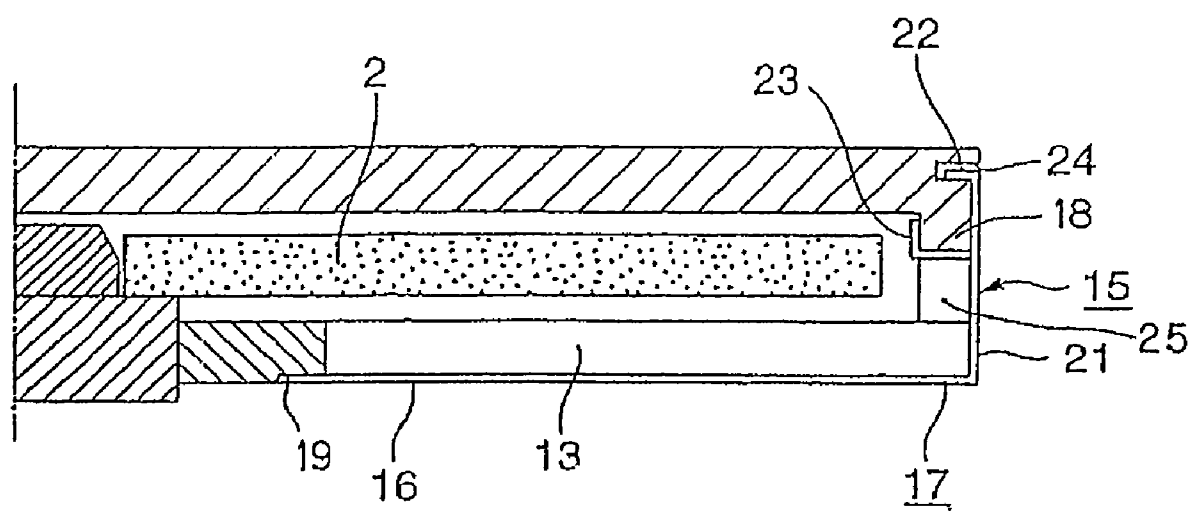
FIG. 6 is a cross-sectional view showing the state in which the shutter member is mounted to the main cartridge body unit.

The shutter unit 15 is arranged on the main cartridge body unit 5 so that the shutter member 16 is extended over the aperture for the head part 13, as shown in FIG. 2. At this time, the shutter unit 15 holds the retention part 17 in a clinching fashion by the first and second engagement pieces 22, 23, by the first engagement piece 22 of the retention part 17 engaging in an engagement groove 24 formed in the lateral side of the slide guide 18 and by the L-shaped second engagement piece 23 engaging with the distal end of the slide guide 18, as shown in FIGS. 5 and 6. The shutter unit 15, carried in this manner, is moved in the directions indicated by arrows A and B for opening/closing the aperture for the head part 13, by being guided by the retention part 17.

Figure 7:
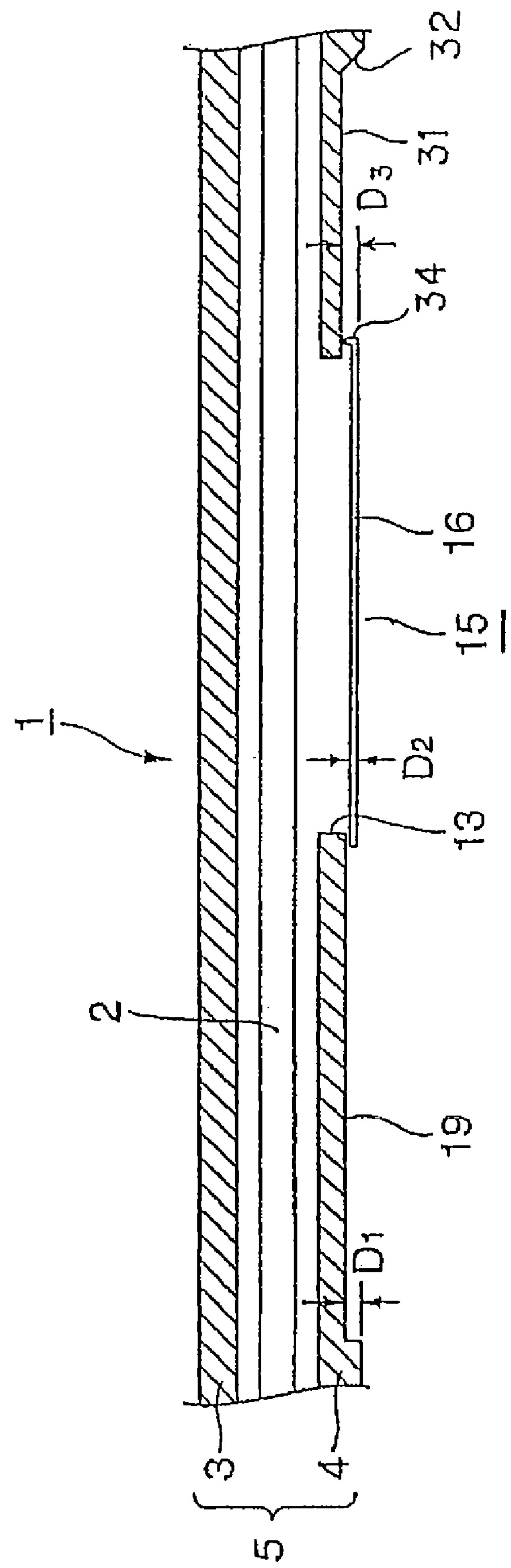
FIG. 7 is a cross-sectional view showing the state in which the aperture for the head formed in the main cartridge body unit has been closed by the shutter member.

The area of the lower cartridge half 4, traversed by the shutter member 16, is formed with a recessed shutter slide part 19. This shutter slide part 19 is formed to a depth $D_1$ approximately equal to a thickness $D_2$ of the shutter member 16 of the shutter unit 15, as shown in FIG. 7, in order that the shutter member 16 is not protruded from the surface of the main cartridge body unit 5, but is extended on the surface of the main cartridge body unit 5, for flattening out the surface of the main cartridge body unit 5.

A recess 31 is formed in the surface of the lower cartridge half 4, on which slides the shutter unit 15 of the main cartridge body unit 5, so that the recess continues to one side of the aperture for the head part 13. This recess 31 operates as an entrance for at least a portion of the optical pickup forming the head part of the recording and/or reproducing means provided to the recording and/or reproducing apparatus. This recess is formed on the opposite side to the shutter slide unit 19 on both sides of the aperture for the head part 13 and extends substantially the whole length of one side of the aperture for the head part 13, as shown in FIGS. 3 and 7.

The recess 31, into which intrudes the head part, is formed to a depth $D_3$ larger than the depth $D_1$ of the shutter slide unit 19, for increasing the amount of intrusion of the optical pickup forming the head part of the recording and/or reproducing means provided on the recording and/or reproducing apparatus, as will be explained subsequently.

The lateral surface of the recess 31 continuing to the aperture for the head part 13 is formed as an inclined surface section 32, as shown in FIG. 5. This inclined surface section 32 serves for avoiding abutment against a portion of the optical pickup intruding into the recess 31, for example, a portion of the optical block forming the optical pickup.

In the disc cartridge 1 of the present invention, one side of the shutter member 16 of the shutter unit 15, closing the aperture for the head part 13, is formed with a bent part 34, closing the space defined between the shutter member 16 and the recess 31, when the shutter unit 15 has moved to a position closing the aperture for the head part 13, as shown in FIG. 7.

Thus, the shutter unit 15, used for the disc cartridge 1 according to the present invention, is able to close the space defined between the shutter member 16 and the recess 31, when the shutter unit 15 has been moved to a position of closing the aperture for the head part 13, as shown in FIG. 7. Consequently, the aperture for the head part 13 may be sealed hermetically to prevent dust and dirt from intruding into the inside of the main cartridge body unit 2 through the aperture for the head part 13 to assure reliable protection of the optical disc 5 accommodated in the main cartridge body unit 2.

In the disc cartridge 1 of the present invention, a cut-out 25 is formed in a region of the upstanding peripheral wall section 4*a* of the lower cartridge half 4 facing the aperture for the head part 13, as shown in FIGS. 2 and 4. That is, the aperture for the head part 13 serves for exposing an area of the main cartridge body unit 5 extending from the inner rim up to the outer rim of the main cartridge body unit 5.

Figure 8:
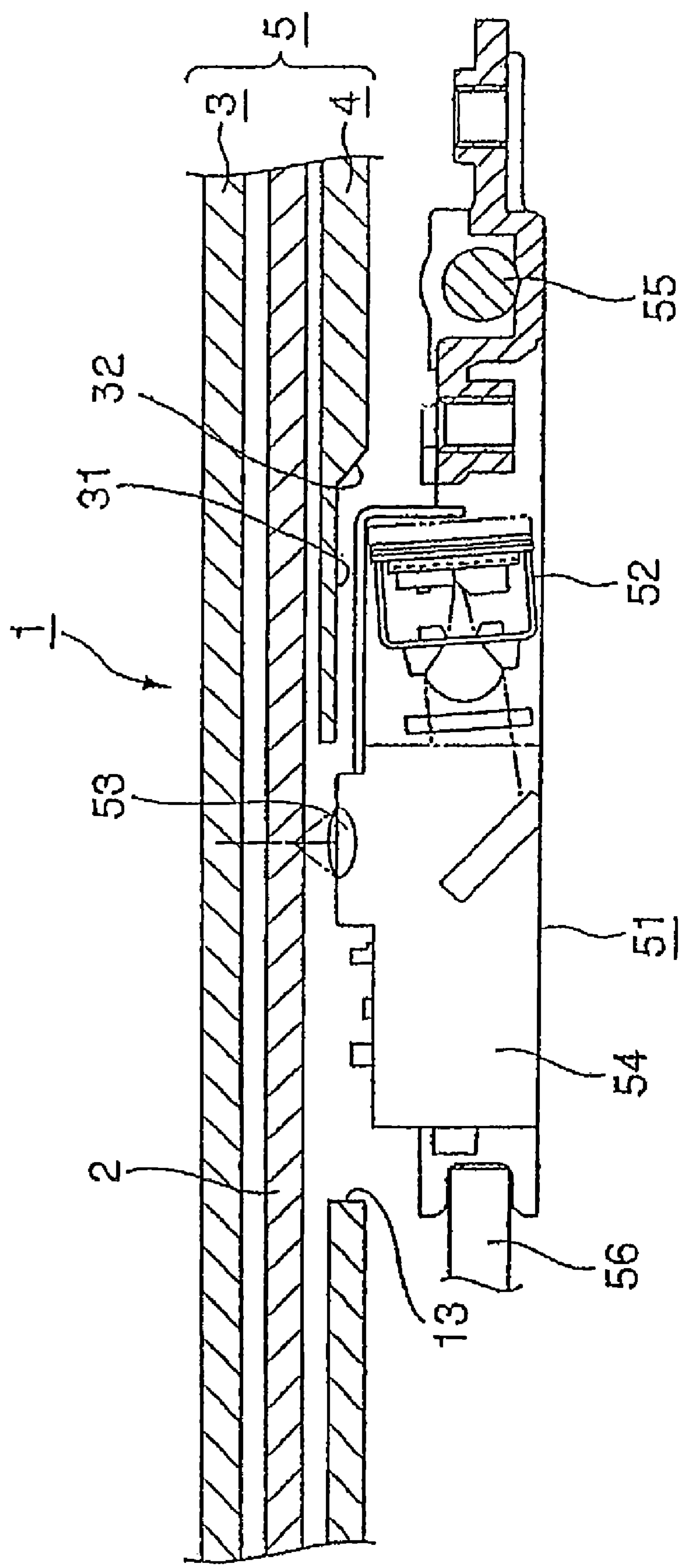
FIG. 8 is a cross-sectional view showing the state in which the disc cartridge of the present invention has been loaded on the recording and/or reproducing apparatus.

When the disc cartridge 1 of the present invention, constructed as described above, is loaded on the recording and/or reproducing apparatus, a portion of the optical pickup 51, forming a head part for reproducing the information signals, recorded on the optical disc 2, may be introduced into the recess 31, as shown in FIG. 8.

Within the recording and/or reproducing apparatus, in which is loaded the disc cartridge 1 according to the present invention, there is provided a cartridge loading section, not shown, for loading the disc cartridge 1 in position. Within the recording and/or reproducing apparatus, there are provided a disc rotation driving mechanism for rotationally driving the optical disc 2 accommodated in the disc cartridge 1 loaded on the cartridge loading section, and an optical pickup 51 forming the head part for scanning the signal recording area of the optical disc 2 rotationally driven by the disc rotation driving mechanism for reproducing the information signals. This optical pickup 51 includes an optical block 52, having enclosed therein a light source for radiating a light beam for scanning the signal recording area of the optical disc 2, optical components for routing the light beam, emanated from the light source, to the optical disc 2, and a light source converter for detecting the return light beam reflected back from the light source for detecting data recorded on the optical disc 2, and a bi-axial actuator 54 having an objective lens 53 for condensing the light beam, radiated from the light source, to the signal recording surface of the optical disc 2.

This optical pickup 51 is carried by a slide guide shaft 55 and a guide 56, arranged parallel to each other in the recording and/or reproducing apparatus, so as to be movable along the radius of the optical disc 2 housed in the disc cartridge 1 loaded on the cartridge loading unit. The optical pickup 51 is arranged at this time so that the objective lens 53 faces the aperture for the head part 13 provided in the disc cartridge 1 and so that the optical block 52 is placed laterally of the aperture for the head part 13.

If, in the present recording and/or reproducing apparatus, the optical disc 2 is to be reproduced, the objective lens 53 may intrude via the aperture for the head part 13 into the inside of the main cartridge body unit 5, so that part of the optical block 52 may intrude into the recess 31 of the disc cartridge 1, as shown in FIG. 8. The result is that the optical pickup 51 in its entirety may be caused to approach to the disc cartridge 1, loaded on the cartridge loading unit, and hence the apparatus in its entirety may be reduced in thickness.

The arrangement is effective in particular for a recording and/or reproducing apparatus employing a disc cartridge 1 having housed therein an optical disc 2 having a diameter equal to 60 mm or less. With the small-sized disc cartridge 1, the aperture for the head part 13 is also small-sized, such that the optical pickup 51 in its entirety cannot be introduced into the inside of the main cartridge body unit 5. In particular, the optical pickup 51, made up by the optical block 52 and the bi-axial actuator 54, cannot be reduced in size further because of its structure.

With the use of the disc cartridge 1, according to the present invention, the optical pickup 51, which is difficult to reduce in size in keeping with the reduction in size of the disc cartridge 1, can be caused to approach to the disc cartridge 1 loaded on the cartridge loading section. That is, the optical pickup 51 may be arranged as the optical block 52 is partially intruded into the recess 31 formed in the disc cartridge 1.

Since the optical pickup 51 may be made to approach to the disc cartridge 1, the recording and/or reproducing apparatus, employing the disc cartridge 1, may be reduced in thickness.

Although the above-described disc cartridge 1 is provided with the shutter unit 15 for closing the aperture for the head part 13, the aperture for the head part may be left in the opened state, without providing the shutter unit.

Figure 9:
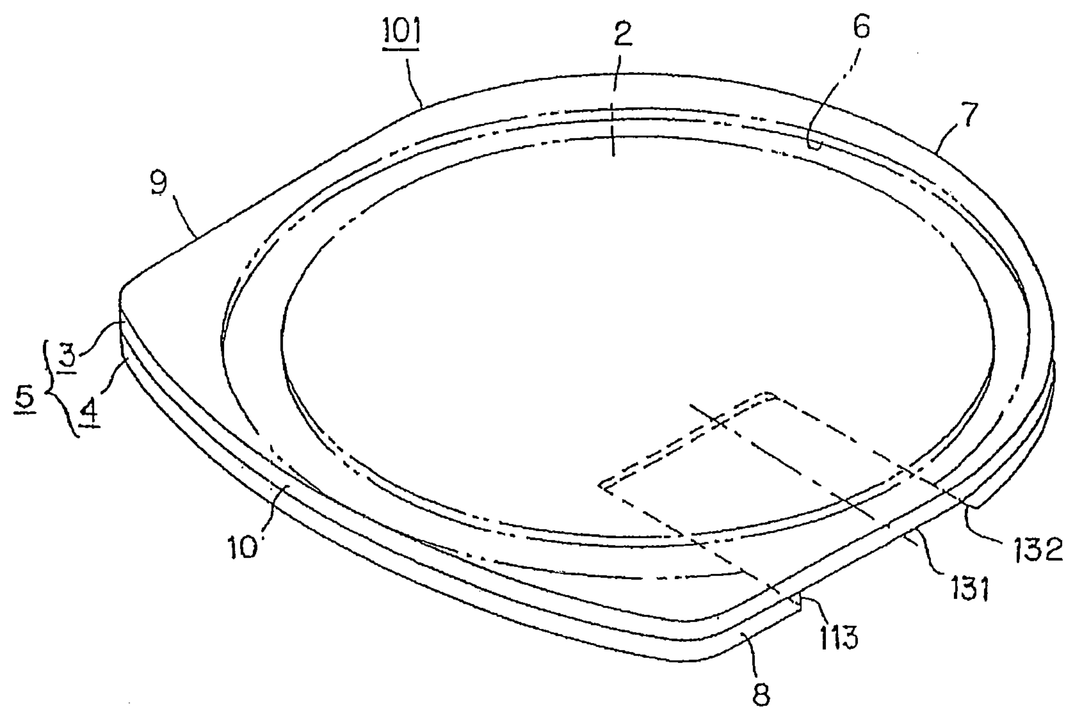
FIG. 9 is a perspective view showing a modification of the disc cartridge of the present invention, looking from the upper cartridge half side.
Figure 10:
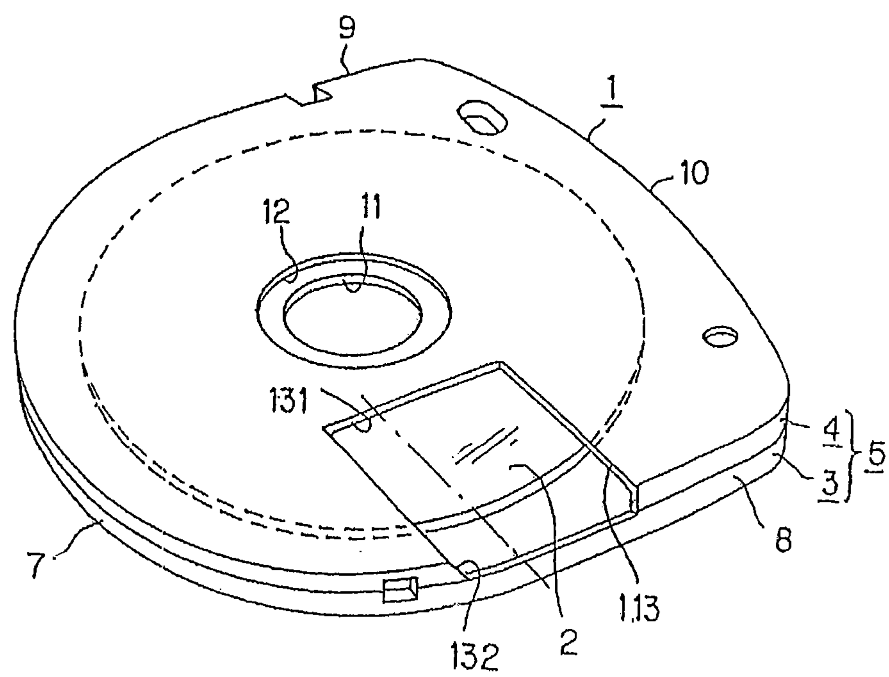
FIG. 10 is a perspective view showing another example of a disc cartridge of the present invention, looking from the lower cartridge half side.

The disc cartridge 101 not having the shutter unit is configured as shown in FIGS. 9 and 10.

Similarly to the disc cartridge 1, a disc cartridge 101, not having the shutter unit, includes a main cartridge body unit 5, comprising an upper cartridge half and a lower cartridge half, abutted and connected to each other, and the optical disc 2 is rotationally mounted in this main cartridge body unit 5.

Referring to FIGS. 9 and 10, the forward surface, as a lateral surface as an inserting end into the disc recording and/or reproducing apparatus, into which the disc cartridge 101 is introduced, is formed as an arcuate section 7, as shown in FIGS. 9 and 10.

The opposite lateral sides of the main cartridge body unit 5, continuing to the arcuate section 7 of the main cartridge body unit 5, are formed as lateral sides 8, 9 not parallel to each other, while the back side thereof, opposite to the arcuate section 7, is formed as a smoothly curved continuous curved surface 10. That is, the back surface of the main cartridge body unit 5, is formed as a curved portion 10 having a radius larger than the radius of the semi-circular arcuate section 7 formed on the forward side of the main cartridge body unit 5.

With this disc cartridge 101, a center opening 11 formed centrally of the optical disc 2 housed in the main cartridge body unit 5, and a circular center recess 12 for exposing the rim part of the center opening 11, are formed centrally of the lower cartridge half 4, as shown in FIG. 10.

In the lower cartridge half 4, an aperture for the head part 113, as a recording and/or reproducing aperture, is formed, as shown in FIG. 10. The aperture for the head part 113 is formed on one lateral surface 8 of the main cartridge body unit 5, and is formed to a rectangular profile from a position proximate to the circular center recess 12 up to the lateral side 8. That is, the aperture for the head part 113 is formed to a rectangular profile of a size large enough to expose a part of the signal recording area of the optical disc 2, housed in the main cartridge body unit 5, to be exposed to outside across the inner and outer rims of the disc.

The lower cartridge half 4 is also provided with an entrance aperture for the head part 131, continuing to the aperture for the head part 113 formed in the disc cartridge 101 of the present embodiment. Into this entrance aperture for the head part 131 may be introduced at least a portion of the optical pickup forming the head part of the recording and/or reproducing means provided to the recording and/or reproducing apparatus. This entrance aperture for the head part 131 is formed in continuation to one side of the aperture for the head part 113 towards the arcuate section 7 operating as an inserting end into the recording and/or reproducing apparatus of the main cartridge body unit 5. That is, with the disc cartridge 101 of the present embodiment, the entrance aperture for the head part 131 is formed, such as by enlarging the side of the aperture for the head part 113 towards the arcuate section 7 of the main cartridge body unit 5.

With this disc cartridge 101, the optical block 52, making up the optical pickup 51, scanning the optical disc 2 of the disc recording and/or reproducing apparatus, may be introduced into the entrance aperture for the head part 131. The result is that the optical pickup 51 in its entirety may be brought to close to the disc cartridge 1, loaded on the cartridge loading section of the recording and/or reproducing apparatus, and hence the recording and/or reproducing apparatus in its entirety may be reduced in thickness.

In this disc cartridge 101, a lateral surface of the entrance aperture for the head part 131 is formed as an inclined surface section 132 for evading abutment against a portion of the optical pickup 51, for example, the optical block 52 of the optical pickup 51.

In the disc cartridge 101, not having the shutter member, the aperture for the head part may be formed as a recess, as in the disc cartridge 1.

The disc cartridges 1, 101 are formed as having housed therein a replay-only optical disc 2. However, the disc cartridge according to the present invention may similarly be applied to a disc cartridge having housed therein a recording and/or reproducing optical disc or the like disc-shaped recording medium with similar favorable results.

It is noted that the recording and/or reproducing apparatus, employing the disc cartridge according to the present invention, uses a head part which differs from one sort of the disc-shaped recording medium to another. Referring to the drawings, a disc cartridge 201 according to a modification of the present invention is now explained.

Figure 11:
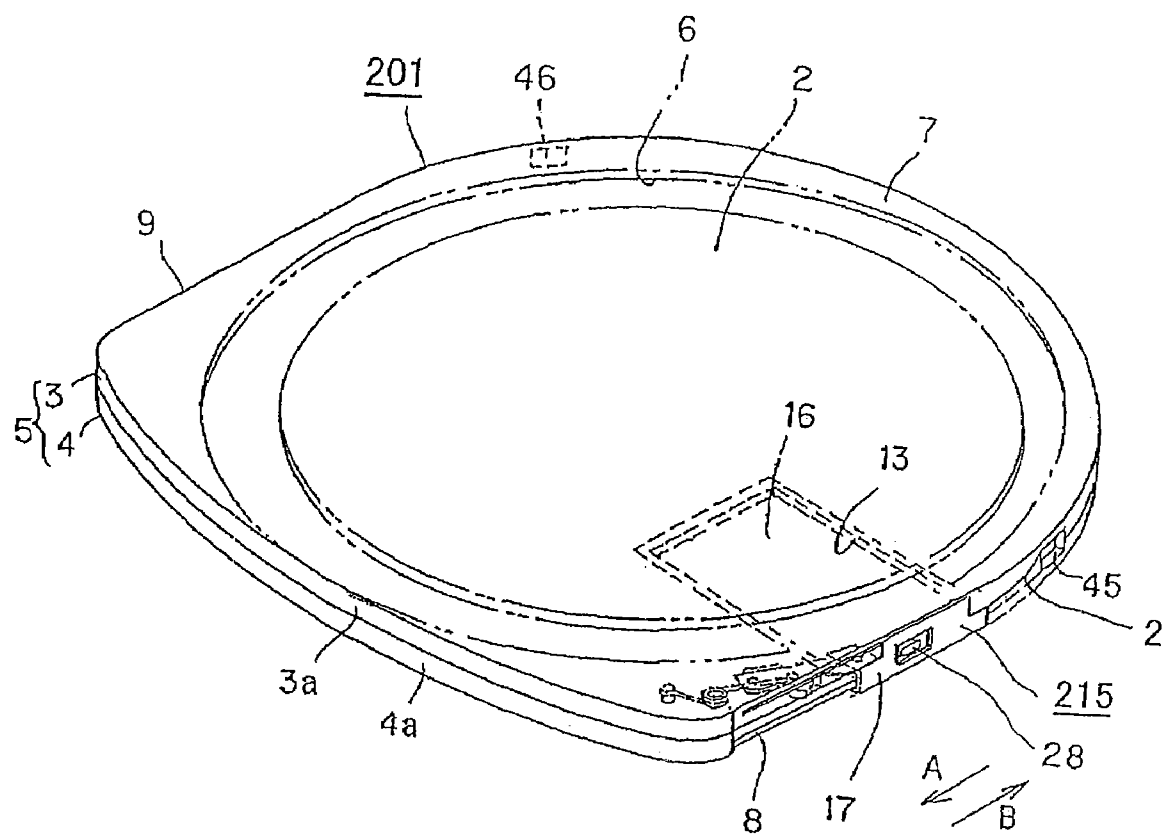
FIG. 11 is a perspective view showing still another example of a disc cartridge of the present invention, looking from the upper cartridge half side.
Figure 12:
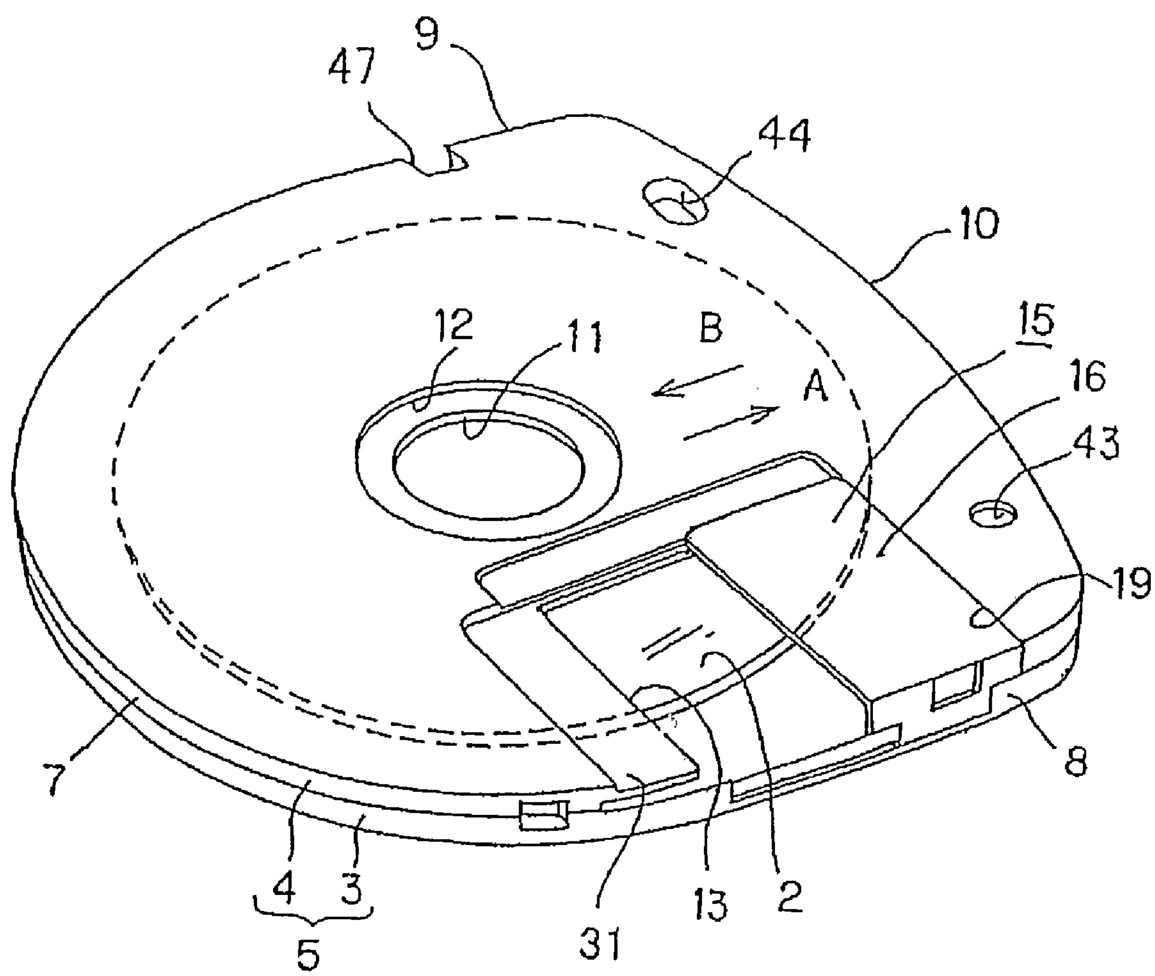
FIG. 12 is a perspective view showing the other example of a disc cartridge of the present invention, looking from the lower cartridge half side.

Similarly to the above disc cartridge, the present disc cartridge 201 has housed therein e.g. an optical disc 2, as a disc-shaped recording medium. The disc cartridge 201 includes a main cartridge body unit 5, obtained by abutting together and combining the upper and lower halves 3, 4, as shown in FIGS. 11 and 12. The optical disc 2 is housed for rotation in the inside of the main cartridge body unit 5.

For the following explanation, common reference numerals are used for depicting the components used in common with the disc cartridge 1.

The disc cartridge 201 has housed therein an optical disc 2, having recorded thereon program data or video data for playing the television game, and is of an extremely small size.

The main cartridge body unit 5, forming the disc cartridge 201 according to the present invention, has its front side, as an inserting side end of the disc cartridge 1 into the disc recording and/or reproducing apparatus, formed as an arcuate section 7, as shown in FIGS. 1 to 3. This arcuate section 7 is formed to a semicircle of the optical disc 2 of a radius $R_1$ housed within the disc housing section 6 of the main cartridge body unit 5, with the center of the disc as a center $P_0$ of the semicircle, as shown in FIG. 3. That is, the arcuate section 7 is formed as a semicircle commensurate with the semicircle of the optical disc 2 housed within the main cartridge body unit 5.

The opposite lateral sides of the main cartridge body unit 5, consecutive to the arcuate section 7 of the main cartridge body unit 5, are formed as sides 8, 9, extending parallel to each other, while the back side of the main cartridge body unit 5, lying opposite to the arcuate section 7, is formed as a uniformly smoothly curved section 10.

At a mid part of the lower cartridge half 4, forming the lower surface of the main cartridge body unit 5, there is formed a circular center opening 12 for exposing a center hole 11 of the optical disc 2 housed in the main cartridge body unit 5, and the ambient part thereof, to outside, as shown in FIGS. 2 and 3. At a mid part of the lower cartridge half 4, forming the lower surface of the main cartridge body unit 5, there is formed an aperture for the head part 13, as a recording and/or reproducing aperture, as shown in FIGS. 2 and 3. The aperture for the head part 13, formed in one lateral surface of the main cartridge body unit 5, is formed to a rectangular profile large enough to permit a portion of the signal recording area of the optical disc 2 to be exposed to outside across the inner and outer rims of the disc. That is, the aperture for the head part 13 is formed facing the rectilinear planar lateral surface 8 other than the forward surface of the main cartridge body unit 5 formed with the arcuate section 7.

To the disc cartridge 201 according to the present invention, there is mounted a shutter unit 215 configured for opening/closing the aperture for the head part 13. The shutter unit 215 includes a rectangular flat-plate-shaped shutter member 216 large enough to close the aperture for the head part 13 and a retention part 217 of a U-shaped cross-section formed towards the substrate of the shutter member 216.

The shutter unit 215 has its part towards the upper cartridge half 3 of the main cartridge body unit 5 carried by the retention part 217 and, in this state, is carried for movement in the direction indicated by arrows A and B in FIG. 12 for opening/closing the aperture for the head part 13. That is, the shutter unit 215 is mounted for movement to the main cartridge body unit 5 in such a manner that a slide guide 18, formed by a portion of an upstanding peripheral wall section **3*a* of the upper cartridge half 3, is carried by the retention part 217, as shown in FIG. 14**.

Figure 14:
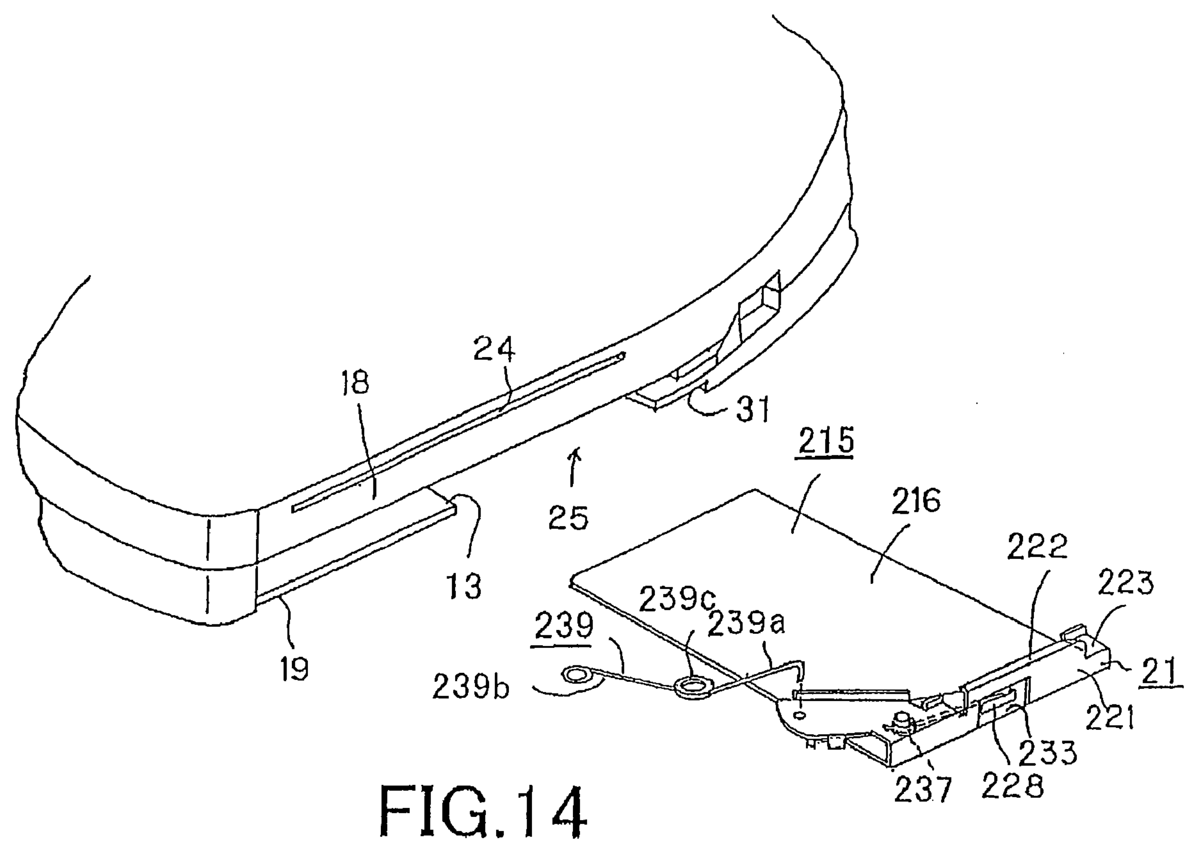
FIG. 14 is a perspective view showing a shutter unit and a main cartridge body unit carrying this shutter unit.
Figure 15:
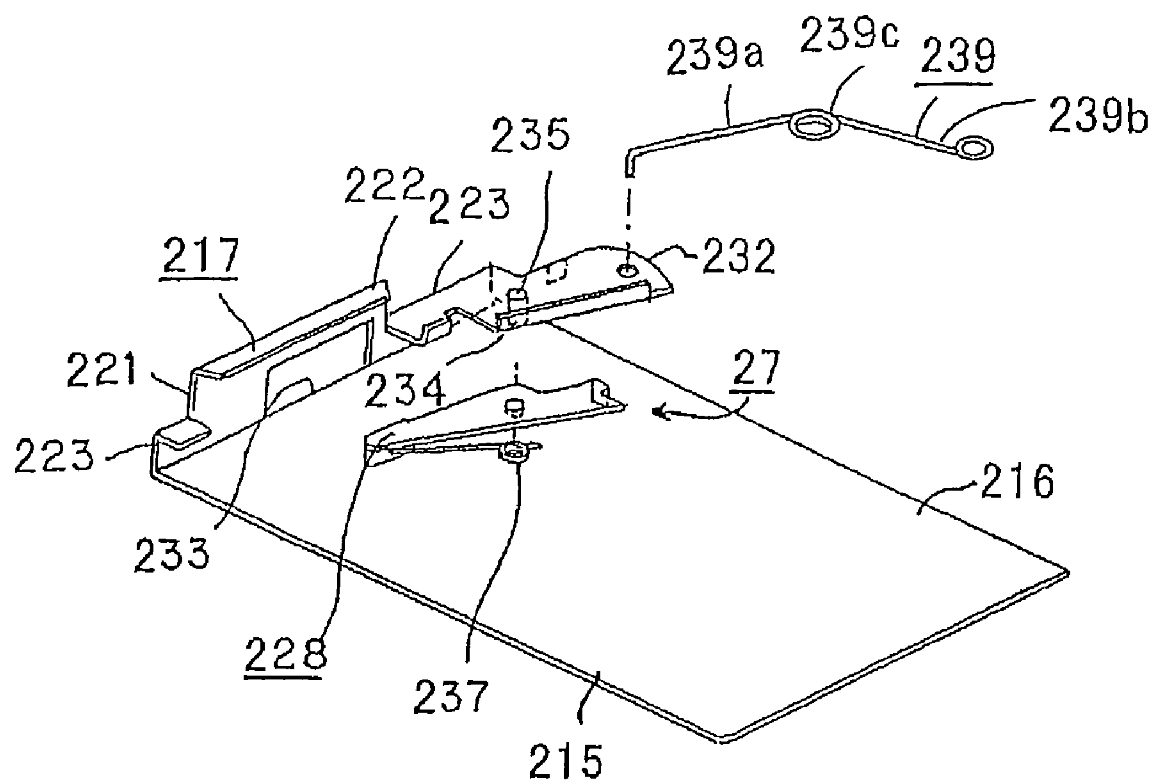
FIG. 15 is a perspective view showing the shutter unit and a shutter lock unit mounted on this shutter unit.

The retention part 217, provided to the shutter unit 215, is formed with a connecting piece 221, formed upright from the proximal end of the shutter member 216, and a first engagement piece 222, bent towards the shutter member 216, is provided to the distal end of the connecting piece 221, as shown in FIGS. 14 and 15. On both sides of the connecting piece 221, there are formed second engagement pieces 223 bent to an L shape at a lower level than the first engagement piece 222. The distal ends of the second engagement pieces 223 are bent to the L shape, with the distal ends thereof protruding towards the first engagement piece 222.

Figure 16:
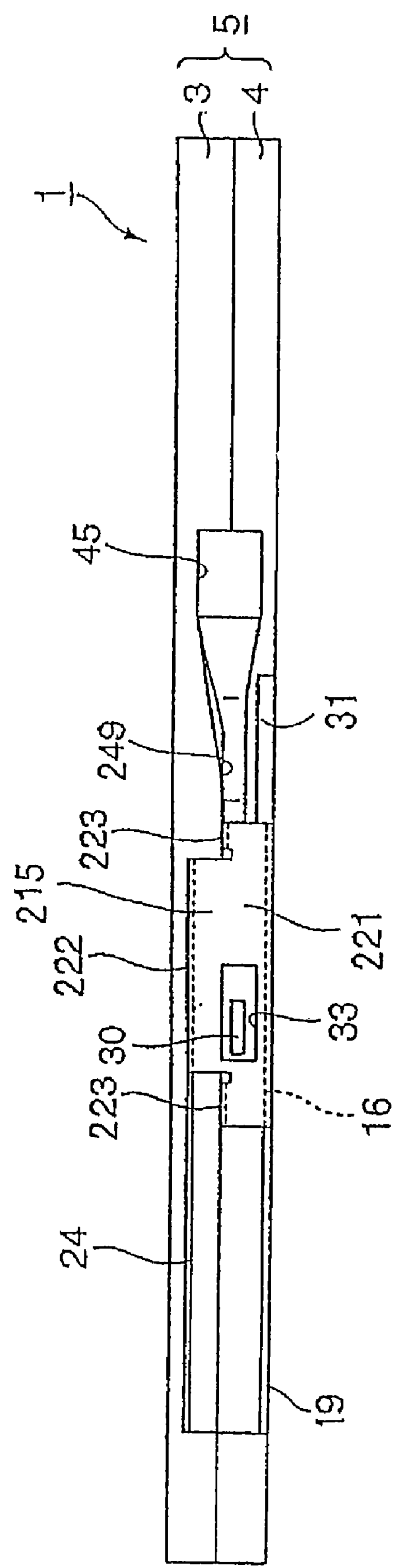
FIG. 16 is a side view showing the lateral side of the disc cartridge, carrying the shutter unit, according to the present invention.
Figure 17:
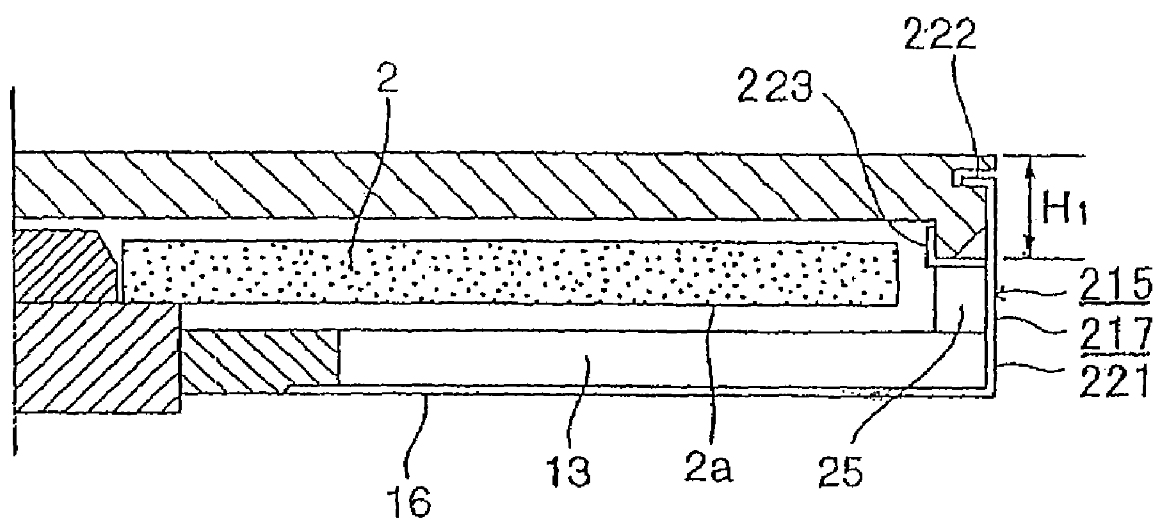
FIG. 17 is a cross-sectional view showing the shutter unit mounted to the main cartridge body unit.

This shutter unit 215 is provided to the main cartridge body unit 5, so that the shutter member 216 extends over the aperture for the head part 13, as shown in FIG. 12. At this time, the first engagement piece 222 provided to the retention part 217 of the shutter unit 215 is engaged in an engagement groove 24 formed in the lateral surface of the slide guide unit 18, while the L-shaped second engagement pieces 223 are engaged with the distal end of the slide guide 18, whereby the shutter unit 1215 carries the retention part 17 by clenching it between the first and second engagement pieces 222, 223, as shown in FIGS. 16 and 17. The shutter unit 215, thus carried, is moved in the directions of arrows A and B in FIG. 12, for opening/closing the aperture for the head part 13 in FIG. 12, as the shutter unit is guided by the retention part 217.

In an area of the lower cartridge half 4, traversed by the shutter member 216, there is formed a recessed shutter slide unit 19. This shutter slide unit 19 is formed to a depth sufficient not to permit the shutter member 216 to emerge from the upper surface of the main cartridge body unit 5.

Referring to FIGS. 14 and 17, a cut-out 25 is formed in an area of the upstanding peripheral wall section 4*a* of the lower cartridge half 4 of the disc cartridge 201 of the present invention. That is, the area of the aperture for the head part 13 extending from the inner rim up to the outer rim of the main cartridge body unit 5 is opened.

At least the part of the slide guide 18 of the upper cartridge half 3 facing the aperture for the head part 13 is of a height $H_1$ not protruded from the lower surface 2*a* of the optical disc 2, facing the lower cartridge half 4, when the optical disc 2, loaded in the disc cartridge 1 in position, as to the height, on the cartridge loading section in the disc recording and/or reproducing apparatus, is loaded on the turntable, as shown in FIG. 17.

With the above-described disc cartridge 201, when the shutter unit 215 is moved to open the aperture for the head part 13, the optical pickup, as a head part for reading out the information signals recorded on the optical disc 2, may be located in its entirety within the main cartridge body unit 5. In addition, when the optical pickup has been moved to a position scanning the outer rim of the optical disc 2, the optical blocks other than an objective lens, converging the light beam, used for scanning the signal recording area of the optical disc 2, may be located outside the main cartridge body unit 5, as the objective lens is located within the main cartridge body unit 5, as will be explained subsequently.

Hence, with the disc cartridge 201 of the present invention, the optical pickup may be located across the inner part and an outer part of the main cartridge body unit 5, as the optical pickup is proximate to the optical disc 2. Thus, the signal recording area may be formed up to the outer rim of the optical disc 2, thereby increasing the recording capacity of the optical disc 2. Moreover, since the optical pickup may be proximate to the optical disc 2, the numerical aperture NA of the objective lens may be larger, while the spot of the light beam condensed on the optical disc 2 may be smaller, thereby increasing the recording density of the information signals recorded on the optical disc 2. Since the recording density may be improved with increase in the recording capacity, the optical disc in need of a preset recording capacity may be reduced in diameter. Since the optical disc 2 may be scanned as the optical pickup is positioned for movement across the inner and outer parts of the main cartridge body unit 5, the main cartridge body unit 5 may be reduced in size, whilst the disc recording and/or reproducing apparatus, employing the disc cartridge 201, may also be reduced in size.

In the surface of the lower cartridge half 4 of the main cartridge body unit 5, on which slides the shutter unit 15, there is further formed a recess 31 in continuation to one side of the aperture for the head part 13. This recess 31 operates as an entrance for at least a portion of the optical pickup forming the head part of the recording and/or reproducing means, provided to the recording and/or reproducing apparatus. The recess is positioned facing the shutter slide 19, on both sides of the aperture for the head part 13, and is formed for extending the entire length of one lateral side of the aperture for the head part 13, as shown in FIGS. 12 and 16.

By providing this recess 31, the part of the optical pickup, forming the head part used for reproducing information signals recorded on the optical disc 2 may be introduced into the recess 31 when the disc cartridge 201 is loaded on the recording and/or reproducing apparatus. Hence, the optical pickup may be brought into proximity of the disc cartridge 201, so that the recording and/or reproducing apparatus may be reduced in thickness.

In the disc cartridge 201, according to the present invention, the shutter unit 215, opening/closing the aperture for the head part 13, is mounted for movement along the flat lateral surface 8 of the main cartridge body unit 5, as shown in FIGS. 11 and 12. Thus, the shutter unit 215 is moved linearly with the retention part 217 contacting with the planar lateral surface 8, and hence may be moved in stability.

Moreover, since the aperture for the head part 13 is formed facing the flat lateral surface 8 of the main cartridge body unit 5, the portion of the lower cartridge half 4 formed with the cut-out 25 is also a rectilinear surface. Hence, even if the cut-out 25 is formed in the lower cartridge half and the lateral surface 8 of the main cartridge body unit 5 facing outwards is opened, the aperture for the head part 13 may be formed in its entirety to a rectangular profile and may positively be closed by the shutter unit 215 having the rectilinear retention part 217 of a U-shaped cross-section.

The disc cartridge 1 according to the present invention is provided with a lock unit 227 for prohibiting the movement of the shutter unit 215 when the shutter unit 215 has been moved to a position closing the aperture for the head part 13. The lock unit 227 of the shutter unit 215 includes a lock lever 228, mounted for rotation to the shutter unit 215, and an engagement part 229 on the main cartridge body unit 5, engaged by this lock lever 228, as shown in FIGS. 15 and 18.

Figure 18:
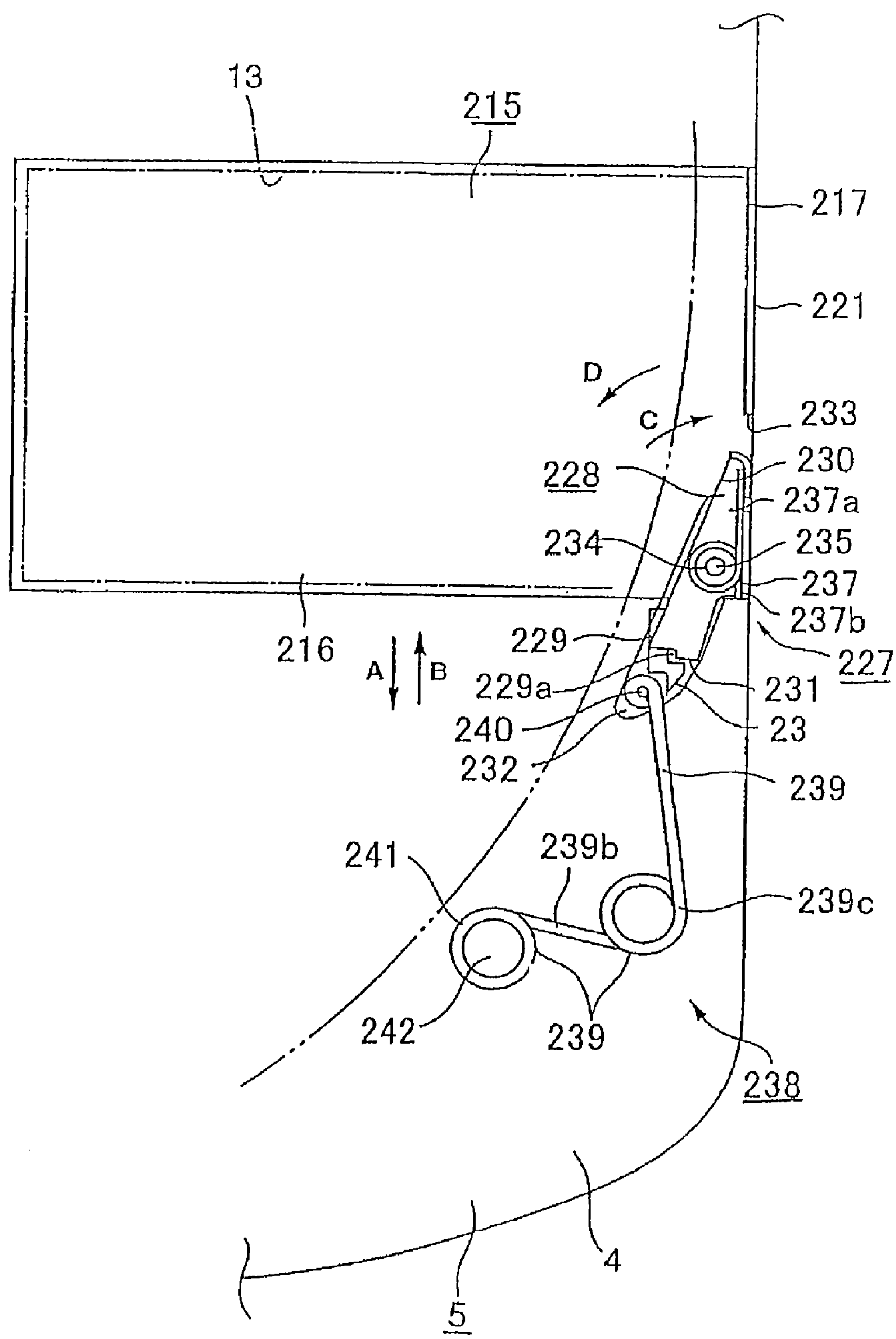
FIG. 18 is a plan view showing the shutter unit locked by the shutter lock unit.

The lock lever 228 is formed as an elongated plate-shaped member, including an upstanding thrust part 230, extending along a lateral side edge thereof, and an upstanding engagement piece 231 on the opposite side for engagement by the engagement part 229, as shown in FIGS. 15 and 18. The lock lever 228 is rotationally mounted on a lock lever mounting piece 232 provided to the shutter unit 15. The lock lever mounting piece 232 is formed for protruding laterally of the shutter member 216 from the upper edge of the connecting piece 221 forming the slide guide 18 of the shutter unit 215.

The lock lever 228 is rotatably mounted about a pivot 235, mounted in turn upright on the lock lever mounting piece 232, as the center of rotation, so that the thrust part 230 at one end thereof faces a rectangular window 233 formed at a mid portion of the connecting piece 221, with a pivot hole 234 at a mid part of the connecting piece 221 in engagement by the pivot 235, as shown in FIGS. 11, 16 and 18. At this time, the engagement piece 231, provided to the opposite side of the lock lever 228, is protruded laterally of the shutter member 216 for extending along the lock lever mounting piece 232.

A window 233 formed in the connecting piece 221 of the shutter unit 215 is engaged by a shutter unit movement inhibiting spring, provided for inhibiting movement of the shutter unit 215, provided to the disc recording and/or reproducing apparatus, to which the disc cartridge 1 is mounted.

The lock lever 228, carried by the shutter unit 215, is rotationally biased by a rotational force energizing spring 237, coiled about the pivot 35, in a direction shown by an arrow C in FIG. 8 for protruding the thrust part 230 from the window 233. The rotational force energizing spring 237 is formed by a torsion coil spring, and has one arm section 237*a* retained by the thrust part 230, while having the other arm section 237*b* retained by the inner surface of the connecting piece 221 of the shutter unit 215, for rotationally biasing the lock lever 228 in the direction indicated by arrow C in FIG. 8.

The rotational position of the lock lever 228 by the rotational force energizing spring 237 is determined by abutment of the side of the lock lever 228 carrying the thrust part 230 against the connecting piece 221.

The shutter unit 215, carrying the lock lever 228 as described above, is mounted for movement to the main cartridge body unit 5, by having the retention part 217 carried by the upper cartridge half 3, as described above.

When the shutter unit 215 is at a position of closing the aperture for the head part 213, as shown in FIGS. 16 and 18, the lock lever 228 is rotated in the direction of arrow C in FIG. 18, under the biasing force of the rotational force energizing spring 237, for introducing the thrust part 230 into the window 233 formed in the connecting piece 221. At this time, the lock lever 228 inhibits movement of the shutter unit 215, by the engagement piece 231 at the opposite end thereof engaging with a mating engaging part 229, provided to the main cartridge body unit 5. The lock lever also operates for retaining the aperture for the head part 13 in a closed state by the shutter unit 216.

The mating engaging part 229 of the main cartridge body unit 5 is provided to an area of the inner surface of the lower cartridge half 4, outside the area of the disc housing section 6, which may be engaged by the engagement piece 231 of the lock lever 228 when the shutter unit 215 is in the closure position. The mating engaging part 229 is formed as one with the lower cartridge half 4. The mating engaging part 229 is formed with an engagement recess **229*a* opened on one side. In this engagement recess 229*a* is introduced the engagement piece 31 provided to the lock lever 228**.

Figure 19:
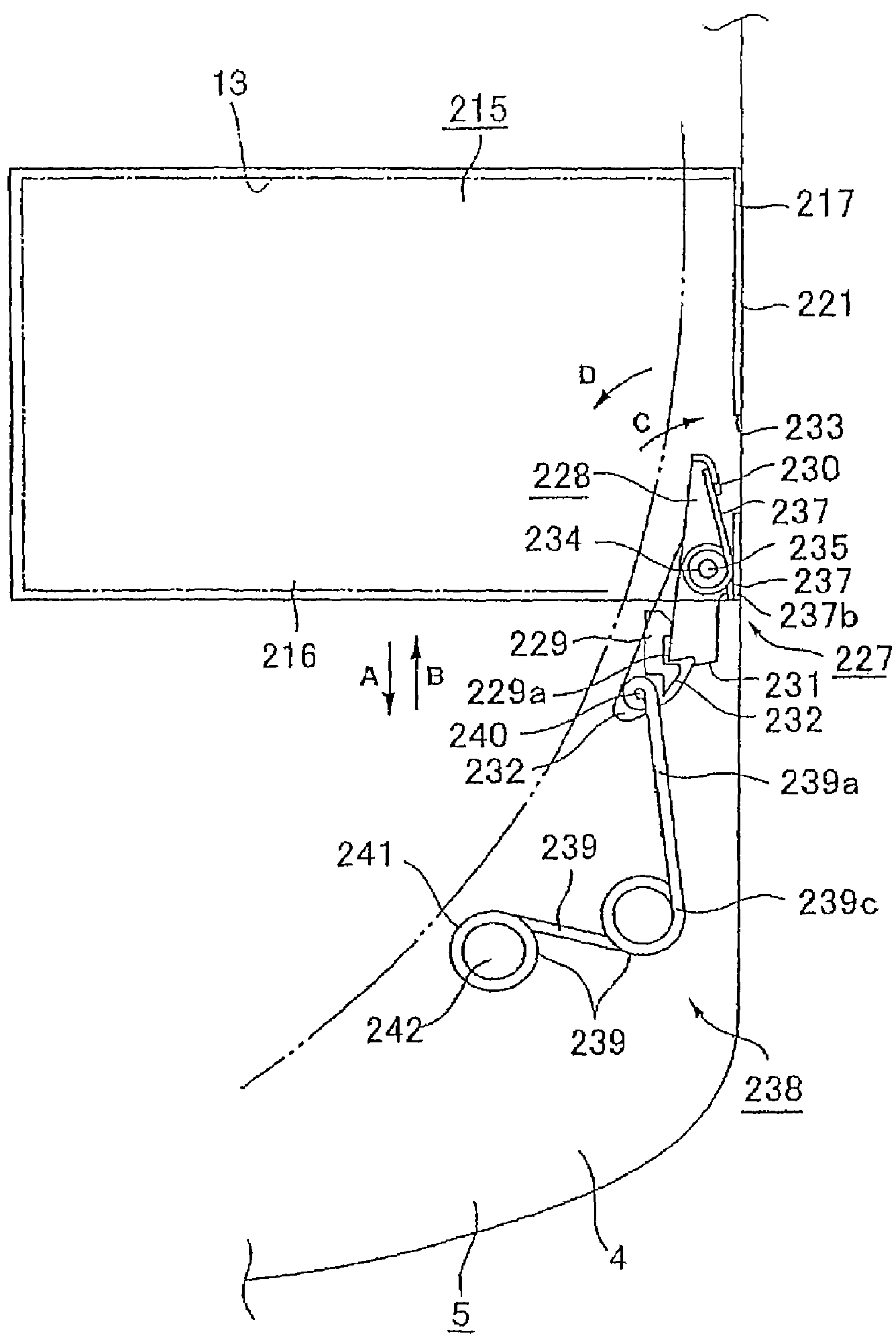
FIG. 19 is a plan view showing the shutter unit in the unlocked state.

When the disc cartridge 201 is introduced into the disc recording and/or reproducing apparatus, the lock lever 228, which has locked the shutter unit 215 in the closure position, is rotated in the direction indicated by arrow D in FIG. 18, against the bias of the rotational force energizing spring 237, by the thrust part 230 being thrust by the shutter unit movement inhibiting spring intruding into engagement with the window 233 formed in the connecting piece 221. When the lock lever 228 is rotated in the direction of the arrow D in FIG. 18, the engagement piece 231 is disengaged from the engagement recess **229*a* of the mating engaging part 229, as shown in FIG. 19, for detaching the engagement piece 231 from the engagement recess 229*a* of the mating engaging part 229, thereby unlocking the shutter unit 215. The shutter unit 215 may now be movable along the direction of the arrow A in FIG. 12, that is, in a direction of opening the aperture for the head part 13**.

Meanwhile, the opening/closure of the aperture for the head part 13 is by relative movement between the main cartridge body unit 5 and the shutter unit 215. The opening/closure of the aperture for the head part 13 will be explained in detail subsequently.

With the above-described lock unit 27 for the shutter unit, in which the lock lever 228, locking the shutter unit 215 in the closure position, is mounted to the shutter unit 215, movable with respect to the main cartridge body unit 5, the lock lever may be moved in unison with the shutter unit 215 to follow up with the opening/closure of the aperture for the head part 13. As a result, the lock lever 228 may be placed such that, when the shutter unit 215 is in the position of closing the aperture for the head part 13, at least the thrust part 230 overlies the aperture for the head part 13, thus enabling the size of the disc cartridge 1 to be reduced. That is, in case the lock lever 228 is provided to the main cartridge body unit 5, it should be necessary to provide the space, in which to arrange the lock lever 228 in its entirety, to the main cartridge body unit 5. This necessity may be eliminated with the disc cartridge 1 of the present invention, such that it is only sufficient to provide solely the mating engaging part 229, engaged by a portion of the lock lever 228, on the main cartridge body unit 5, with the consequence that the main cartridge body unit 5 may further be reduced in size.

The disc cartridge 201, according to the present invention, may further be provided with a shutter opening/closure unit 238 realizing the reliable movement of the shutter unit 15 opening/closing the aperture for the head part 13 and which positively holds the shutter unit 215 in the position of opening or closing the aperture for the head part 13.

This shutter opening/closure unit 238 is formed using a bi-directional energizing unit for selectively energizing the shutter unit 215 into movement in two directions, viz. in a direction of opening the aperture for the head part 213 and in a direction of closing the aperture for the head part. Specifically, the bi-directional energizing unit is formed by a torsion coil spring 239, as shown in FIG. 18. This torsion coil spring 239, mounted between the shutter unit 215 and the main cartridge body unit 5, is arranged at a location towards which the shutter unit 215 is moved in the direction of opening the aperture for the head part 13, as shown in FIG. 18. Specifically, the torsion coil spring 239 is mounted by engaging the distal end of an arm section **239*a* in an engagement opening 240 formed in the distal end of the lock lever mounting piece 232 and by engaging a ring 241 at the distal end of the other arm section 239*b* by a support pin 242 protuberantly formed on the inner surface of the main cartridge body unit 5**.

Figure 20:
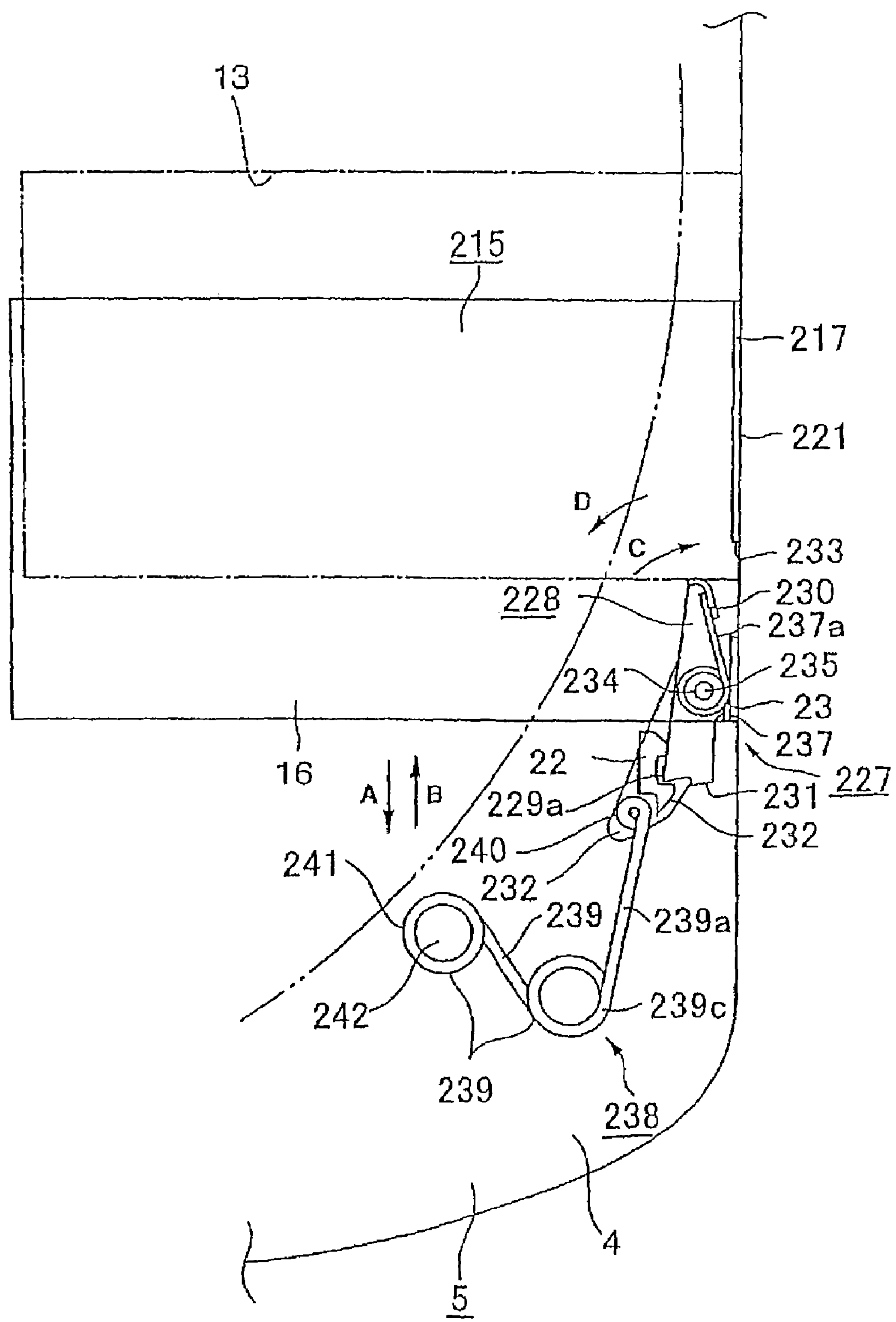
FIG. 20 is a plan view showing the state in which the shutter unit is being moved in a direction of opening an aperture for a head unit.
Figure 21:
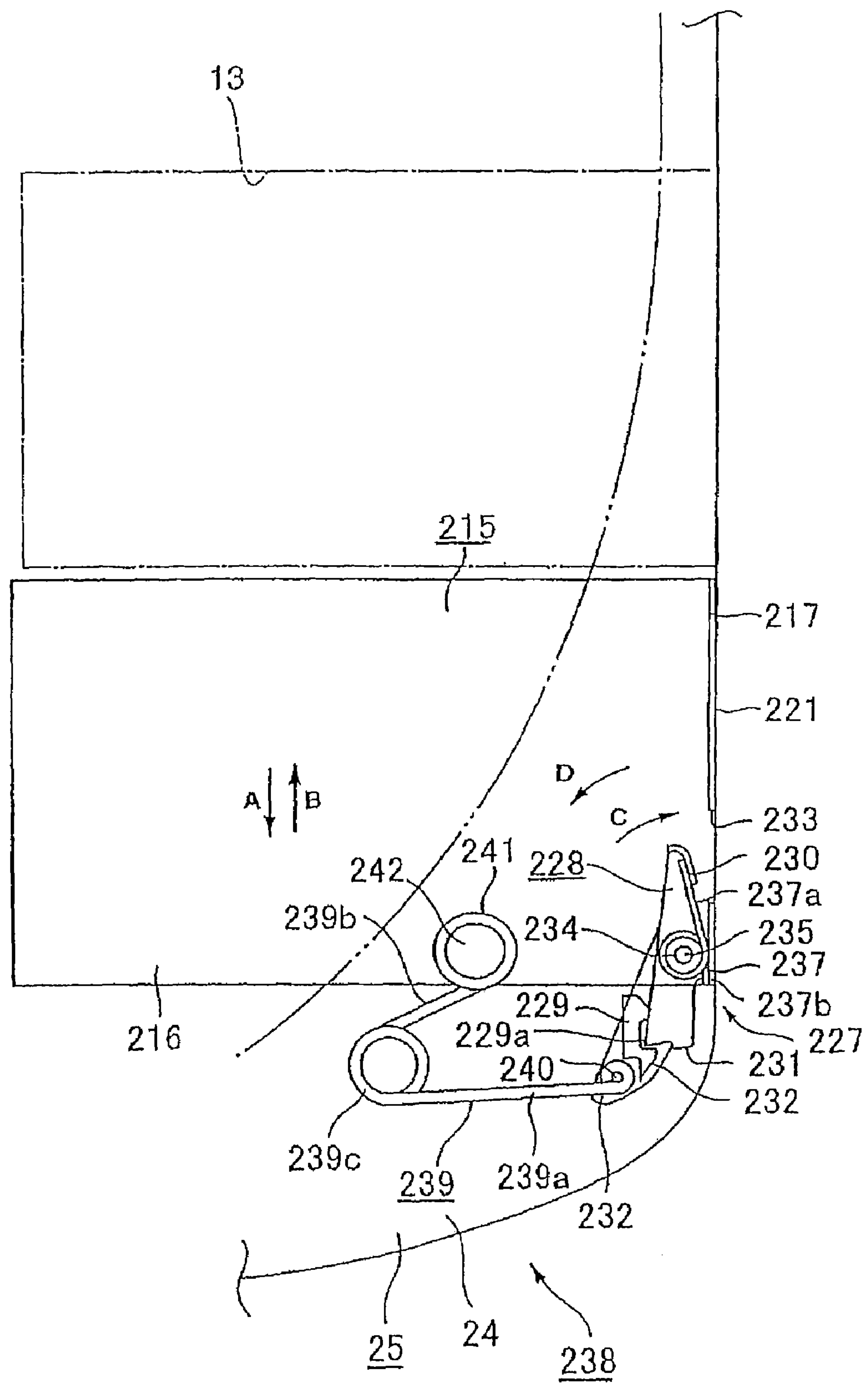
FIG. 21 is a plan view showing the state in which the shutter unit has been moved in a direction of opening the aperture for the head unit.
Figure 22:
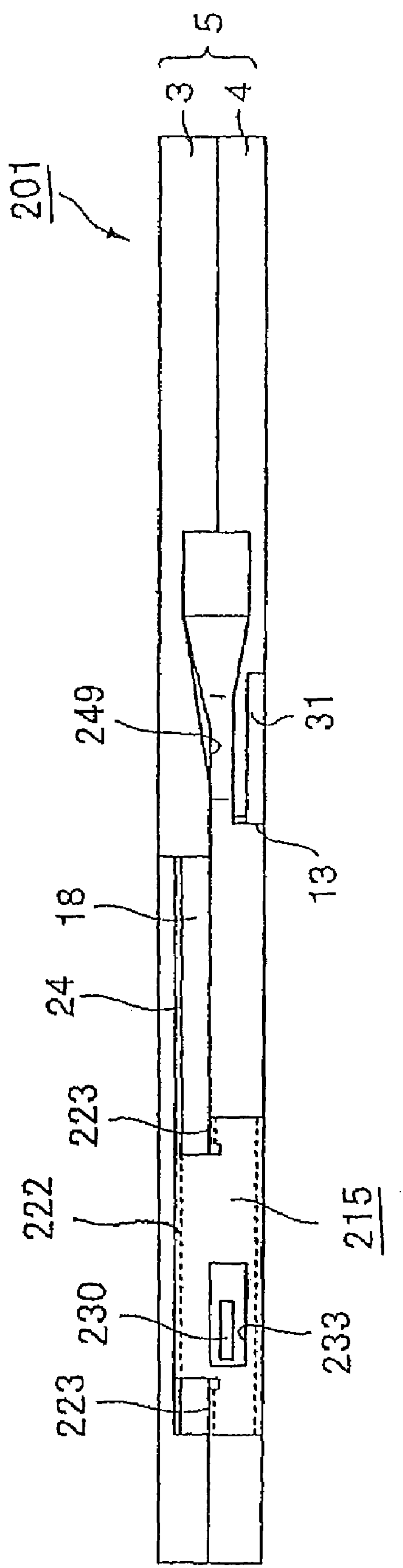
FIG. 22 is a side view of the disc cartridge showing the opened state of the aperture for the head unit.

When the torsion coil spring 239 is at the position of closing the aperture for the head part 13, the torsion coil spring 239 biases the shutter unit 215 in the direction indicated by the arrow B in FIG. 18 for retaining the state of closing the aperture for the head part 13. When the disc cartridge 201 is loaded on the disc recording and/or reproducing apparatus, and the shutter unit 215, released from the locked state by the lock unit 227 for the shutter unit, is moved relative to the main cartridge body unit 5 in the direction of the arrow A in FIG. 18 for opening the aperture for the head part 13, a coil part **239*c*, formed centrally of the spring in an unfixed state, is moved in the direction of arrow A, along which is moved the shutter unit 215. When the coil part 239*c* of the torsion coil spring 239 is further moved along the direction of the arrow A and is moved beyond the location of a support pin 242, along the direction of movement of the shutter unit 15, as shown in FIG. 20, the biasing direction is reversed. On reversion of the biasing direction, the torsion coil spring 239 biases the shutter unit 215 into movement along the arrow A in FIG. 20. Thus, the shutter unit 215 is moved in a direction of opening the aperture for the head part 13, to retain the aperture for the head part 13 in the opened position, as shown in FIGS. 21 and 22**.

When the disc cartridge 201, in a state in which the shutter unit 215 retains the aperture for the head part 13 in the opened position, is taken out from the disc recording and/or reproducing apparatus, by way of performing the operation for ejection, the shutter unit 215 is moved along the direction of arrow B in FIG. 20, relative to the main cartridge body unit 5, with the center coil part **239*c* being similarly moved along the direction of arrow B. When the shutter unit 215 is further moved along the direction of arrow B, such that it surpasses the location of the support pin 242 along the direction of movement of the shutter unit 215, the biasing direction is reversed. On reversion of the biasing direction, the torsion coil spring 239 biases the shutter unit 215 into movement along the arrow B in FIG. 19, such that the shutter unit 215 is moved in the direction of closing the aperture for the head part 213**, thereby retaining the aperture for the head part in the closed state.

The shutter unit 215, biased by the torsion coil spring 239, forming the bi-directional energizing unit, is carried in the position of closing the aperture for the head part 13 or in the position of opening the aperture for the head part 13, under the biasing force of the torsion coil spring 239, and hence may be maintained reliably in the position of closing or opening the aperture for the head part 13.

In the disc cartridge 201, according to the present invention, provided not only with the lock unit 227 for the shutter unit, locking the shutter unit 215 in the closed position, but also with the shutter opening/closure unit 238, having the bi-directional energizing unit for selectively biasing the shutter unit 215 in the two directions, the shutter unit 215 may be reliably retained in the position of closing the aperture for the head part 13, while the reliable opening/closure operation for the aperture for the head part 13 may be achieved.

For reliably closing the aperture for the head part 13, it is only sufficient to provide the lock unit 227 for the shutter unit. For realizing a stable opening/closure movement of the shutter unit 215, maintaining the closed state of the aperture for the head part 13, and for reliably maintaining the opened state of the aperture for the head part 13, it is possible to provide only the shutter opening/closure unit 238 having the bi-directional energizing unit.

In the disc cartridge 201, according to the present invention, the lateral surface 8 of the main cartridge body unit 5, carrying the shutter unit 215, is formed with a guide groove 49, into which intrudes a shutter unit releasing piece, provided to the disc recording and/or reproducing apparatus, as shown in FIGS. 11, 16 and 22.

Figure 13:
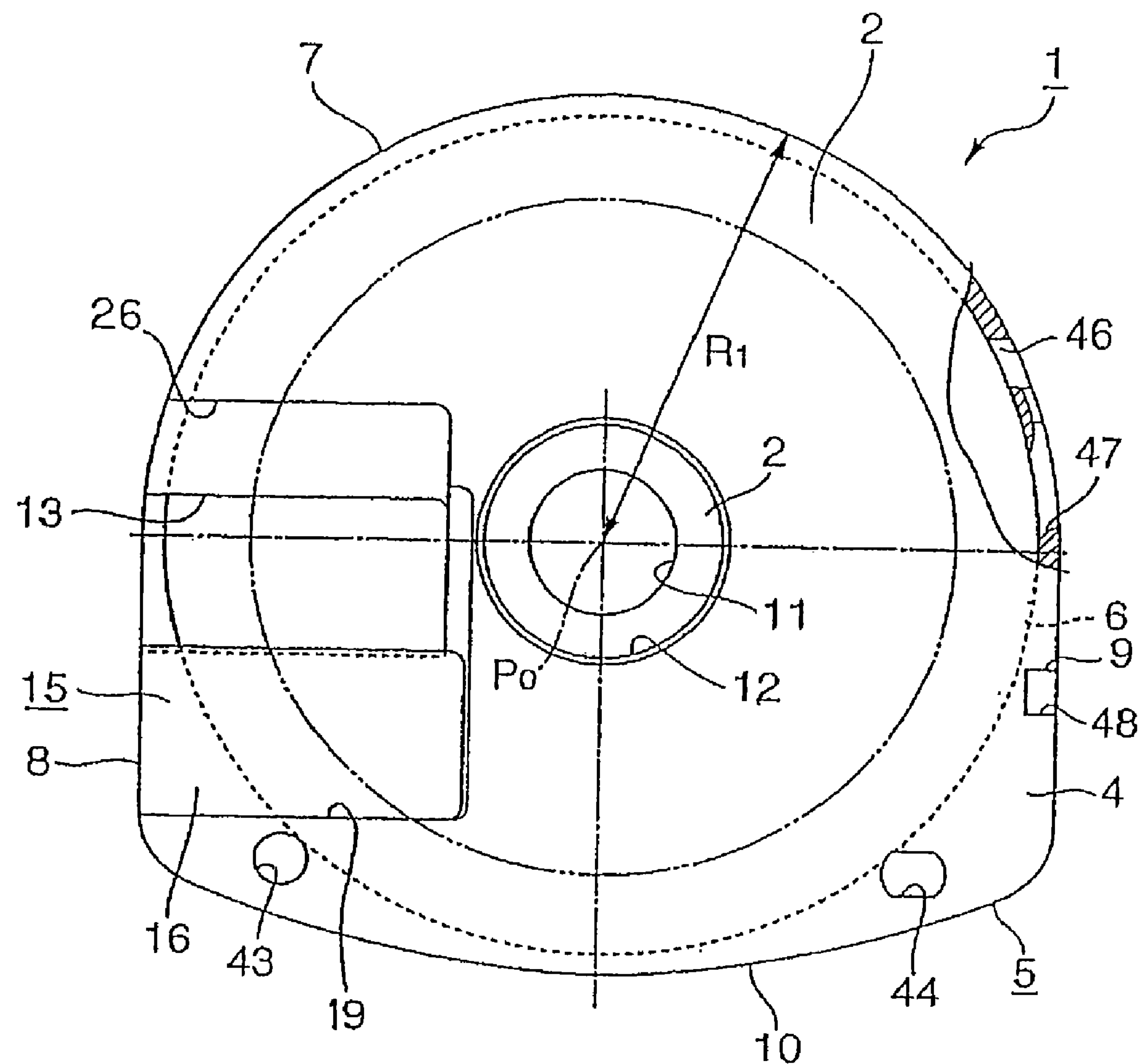
FIG. 13 is a plan view showing a further example of a disc cartridge of the present invention, looking from the lower cartridge half side.

In the lower surface of the main cartridge body unit 5, on both sides of the back surface thereof, forming the curved section 10, there are formed first and second positioning holes 43, 44, engaged by positioning pins, provided to the disc recording and/or reproducing apparatus, as shown in FIGS. 12 and 13. Meanwhile, the second positioning hole 44 is formed as an elongated hole, having the width-wise direction, lying at right angles to the direction of movement of the shutter unit 15, as a long radius.

On both lateral sides 8, 9 of the arcuate section 7 of the main cartridge body unit 5, there are provided engagement recesses 45, 46, engaged by a portion of a cartridge loading unit, provided to the recording and/or reproducing apparatus for loading the disc cartridge 201 thereon, as shown in FIGS. 11 and 12.

In a location proximate to the opposite lateral side 9 of the arcuate section 7 of the main cartridge body unit 5, there is provided an engagement recess 47 for ejection, engaged by a portion of an ejection unit provided to the recording and/or reproducing apparatus, as shown in FIG. 12.

In the lateral sides 8, 9 or in the bottom surface of the cartridge main body unit 5, a discriminating opening or a discriminating recess for identifying the sort of the optical disc 2 is provided as necessary.

An embodiment of the disc recording and/or reproducing apparatus, employing the disc cartridge 201, according to the present invention, is hereinafter explained.

In the disc cartridge 201, according to the present invention, there is housed the optical disc 2, having recorded thereon the program data or video data needed for executing e.g. a TV game. The disc recording and/or reproducing apparatus, employing the disc cartridge 201 of the present invention, housing this sort of the optical disc 2, is made up by a main body unit of the apparatus 251, carrying the disc cartridge 1, and having enclosed therein a disc driving unit for reproducing at least data recorded on the optical disc 2, and by a display 252 for demonstrating image data or text data reproduced from the optical disc 2, as shown in FIG. 23.

Figure 23:
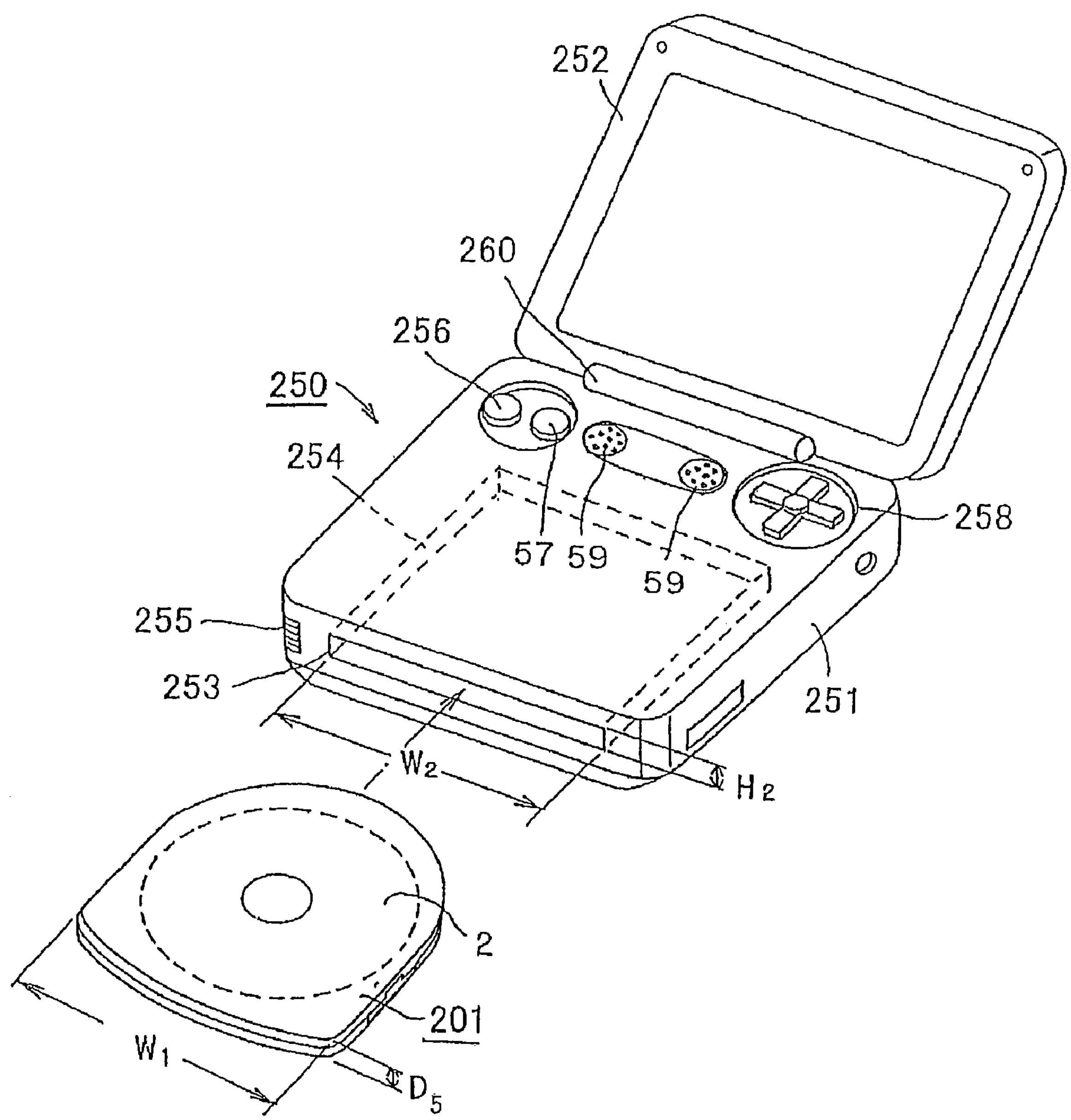
FIG. 23 is a perspective view showing an example of a disc drive device employing a disc cartridge according to the present invention.

Within the main body unit of the apparatus 251 of a disc driving device 250, having enclosed therein the disc driving unit, shown in FIG. 23, there is provided a cartridge loading unit, not shown, including a cartridge holder for loading the disc cartridge 201 thereon. In the front surface, forming one of the lateral sides of the main body unit of the apparatus 251, there is formed a cartridge inserting/ejecting opening 253 for inserting the disc cartridge 201 into a cartridge holder and for ejecting the disc cartridge 201 loaded in the cartridge holder. The cartridge inserting/ejecting opening 253 is formed as an opening just large enough to permit insertion/removal of the disc cartridge 201, and has a width $W_2$ and a height $H_2$ slightly larger than the width $W_1$ and a thickness $D_1$, respectively, of the disc cartridge 201 inserted therein. Within the main body unit of the apparatus 251, there is arranged a cartridge holder 254 facing the cartridge inserting/ejecting opening 253.

On one side of the front surface of the main body unit of the apparatus 251, there is mounted an ejection button 255 for ejecting the disc cartridge 201 held by the cartridge holder 254.

On one side of the upper surface of the main body unit of the apparatus 251, there are provided actuating buttons 256, 257 of a control switch, used for carrying out e.g. a TV game. On the other side thereof, a control key 258 for scrolling the image demonstrated on the display 252. There is also provided a loudspeaker 259 for radiating audio signals reproduced from the optical disc 2.

Although not shown, a control bobbin for e.g. a reproducing button, for controlling the disc driving unit, and an actuating button for a power supply switch, are provided to the main body unit of the apparatus 251.

The display 252 is provided on the back side, opposite to the front side, carrying the cartridge inserting/ejecting opening 253 of the main body unit of the apparatus 251, for swinging relative to the main body unit of the apparatus 251 via a hinge unit 260. The display 252 may be swung towards the main body unit of the apparatus 251 so as to be superposed on the upper surface thereof. The display 252 is formed by a liquid crystal display panel.

The state in which the disc cartridge 201 according to the present invention is loaded on the disc driving unit 250, constructed as described above, is hereinafter explained.

For loading the disc cartridge 201 on the disc driving device 250, the disc cartridge 201 is inserted via the cartridge inserting/ejecting opening 253 into the main body unit of the apparatus 51, with the arcuate section 10 as the inserting side, so as to be held on the cartridge holder 254, as shown in FIG. 23.

Meanwhile, with the disc cartridge 201 according to the present invention, the inserting end thereof via the cartridge inserting/ejecting opening 253 is formed as the approximately semicircular arcuate section 7, so that, even when the disc cartridge 1 is inserted with a centerline $P_2$ along the widthwise direction of the disc cartridge significantly inclined with respect to the centerline $P_1$ along the width-wise direction of the cartridge inserting/ejecting opening 253, the disc cartridge can be smoothly inserted into the cartridge inserting/ejecting opening 253 and reliably held by the cartridge holder 254.

Figure 24:
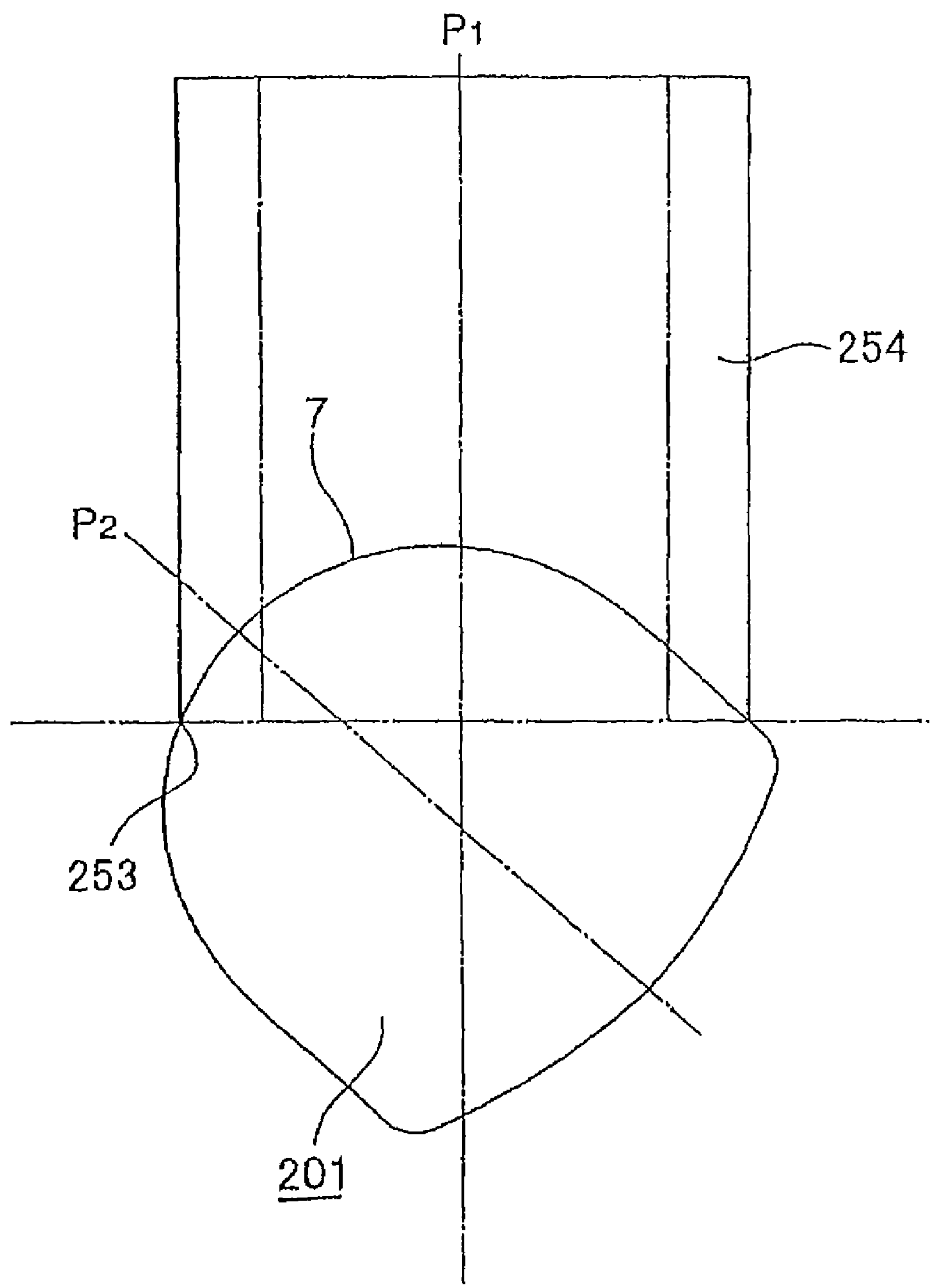
FIG. 24 is a plan view showing the state in which the disc cartridge is being inserted with a tilt into a cartridge insertion/ejecting opening of the disc driving unit.
Figure 25:
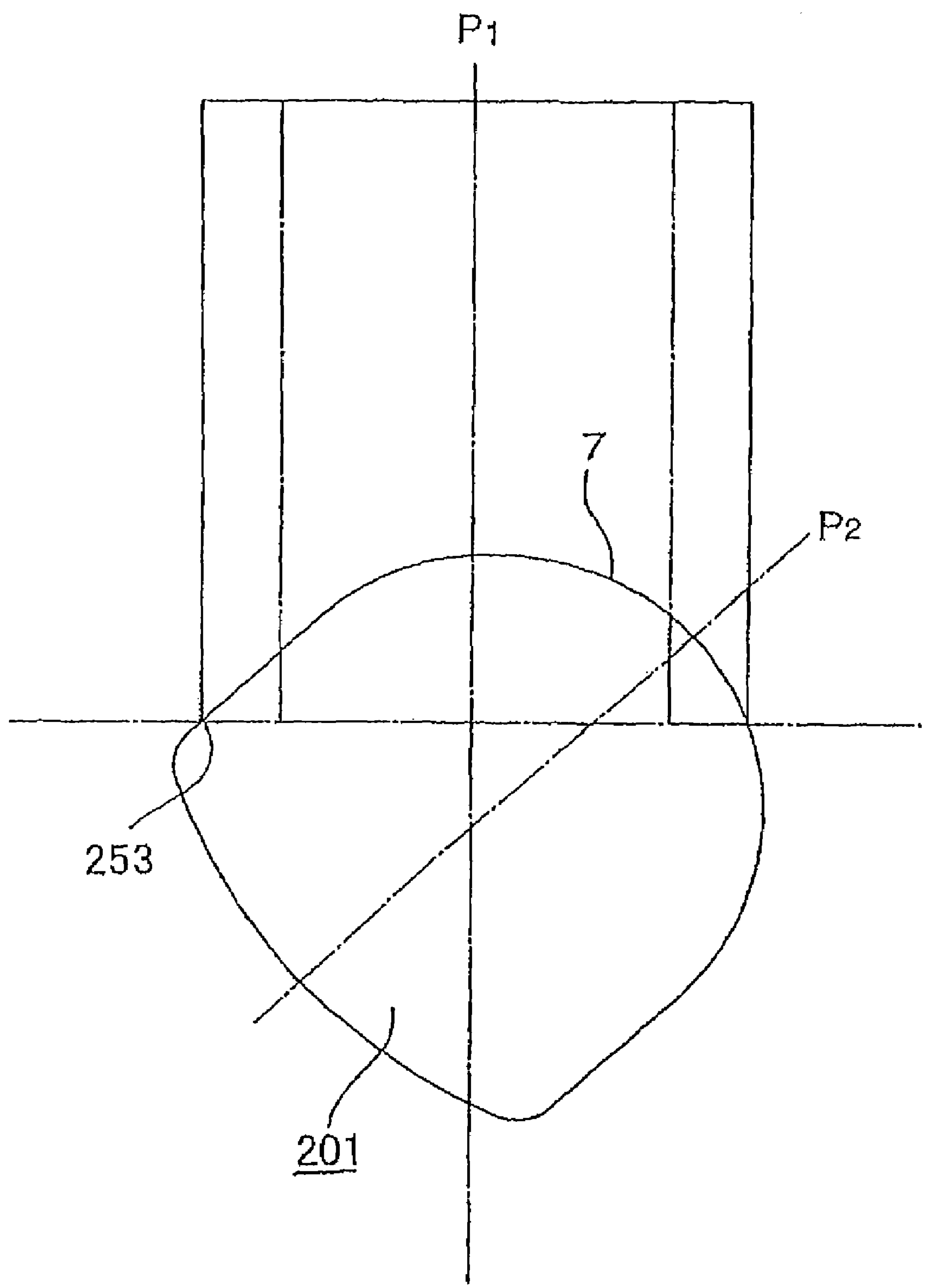
FIG. 25 is a plan view showing the state in which the disc cartridge is being inserted with a tilt in the opposite direction into a cartridge insertion/ejecting opening of the disc driving unit.
Figure 26:
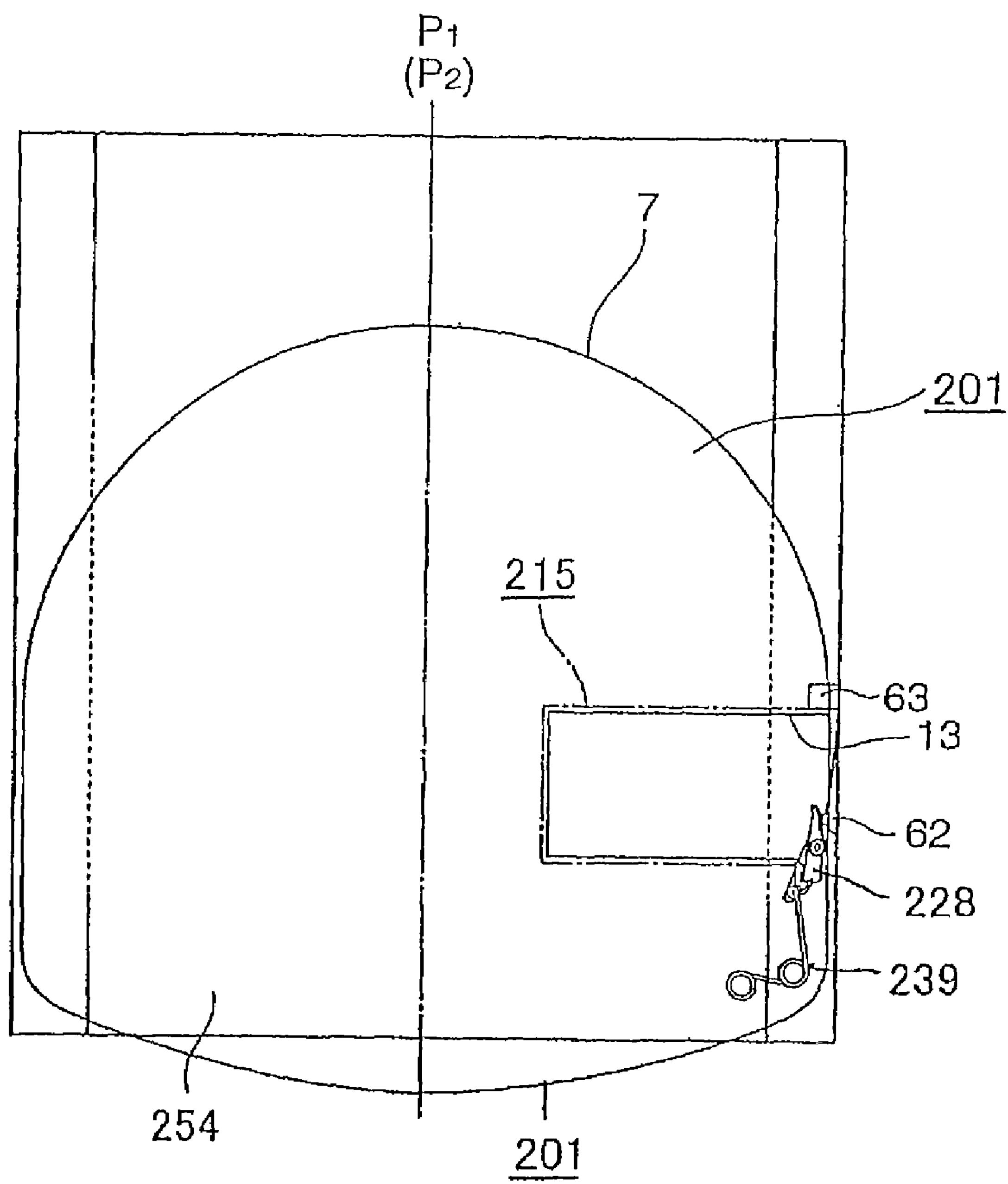
FIG. 26 is a plan view showing the state in which the disc cartridge has been inserted into a cartridge holder with a controlled orientation.

That is, the disc cartridge 201, having the inserting end formed as the approximately semicircular arcuate section 7, may be inserted into the main body unit of the apparatus 251 at the approximately semicircular arcuate section 7, even in case the disc cartridge is inserted via the cartridge inserting/ejecting opening 253 with the width-wise centerline $P_2$ inclined by an angle up to approximately 45° towards left or right of the width-wise centerline $P_1$ of the cartridge inserting/ejecting opening 253, as shown in FIG. 24 or 25. At this time, the disc cartridge 201 may be corrected in its orientation by rotating it in a direction causing the coincidence of the centerlines $P_1$ and $P_2$, in the course of the insertion thereof through the cartridge inserting/ejecting opening 253, with the portion of the arcuate section 7, abutting against one of the lateral sides of the cartridge inserting/ejecting opening 253, as the center of rotation, as shown in FIG. 26. Thus, the disc cartridge 1, according to the present invention, may reliably be inserted into the cartridge holder 254, even in case the inserting direction thereof through the cartridge inserting/ejecting opening 253 is inclined significantly.

Figure 27:
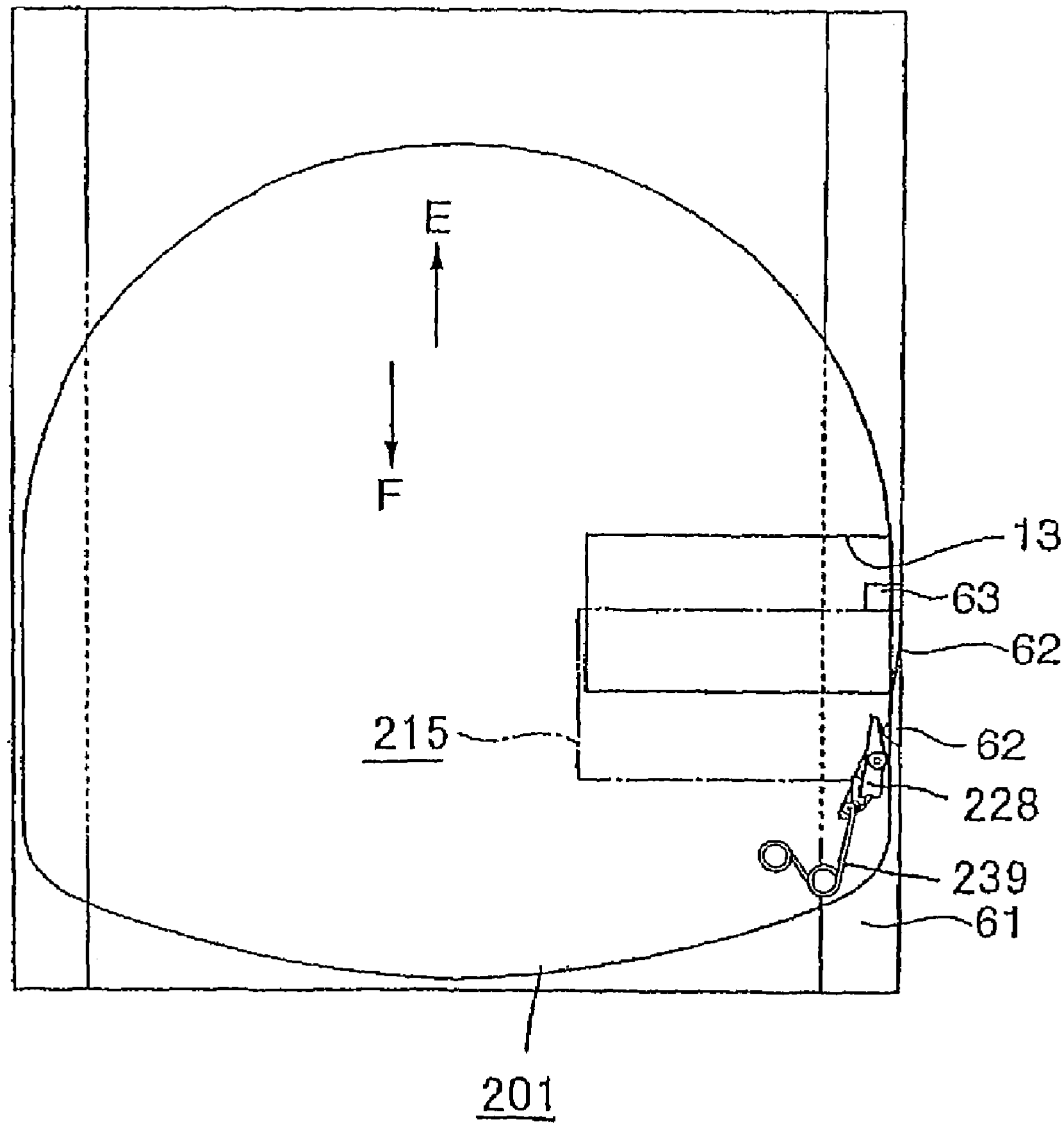
FIG. 27 is a plan view showing the state in which the disc cartridge has been inserted into a cartridge holder to unlock the shutter unit.

The disc cartridge 201, inserted into the cartridge holder 254, is further introduced into the cartridge holder 254, whereby the shutter unit 215 is moved relative to the main body unit of the apparatus 251 to open the aperture for the head part 13. That is, when the disc cartridge 201 has been introduced halfway in the cartridge holder 254, as shown in FIG. 27, a portion of a shutter unit movement inhibit spring 62, formed by segmenting a part of the sidewall section of an L-shaped cartridge retention part 261 in one lateral side of the cartridge holder 254, intrudes into the window 233 formed in the connecting piece 221 of the shutter unit 215, thereby thrusting the thrust part 230 to cause rotation of the lock lever 228 in the direction indicated by arrow D in FIG. 19, as described previously. When rotated in the direction indicated by arrow D in FIG. 19, the lock lever 228 is disengaged from the mating engaging part 229 of the engagement piece 231 to release the lock of the shutter unit 215 with respect to the main cartridge body unit 5. When unlocked from the main cartridge body unit 5, the shutter unit 215 is movable relative to the main cartridge body unit 5.

The cartridge holder 254, on which is loaded the disc cartridge 1 according to the present invention, is further provided with a shutter releasing piece 63. This shutter releasing piece 63 intrudes into a guide groove 49, formed in the lateral surface 8 of the main cartridge body unit 5, until it abuts against the lateral side of the shutter unit 215.

Figure 28:
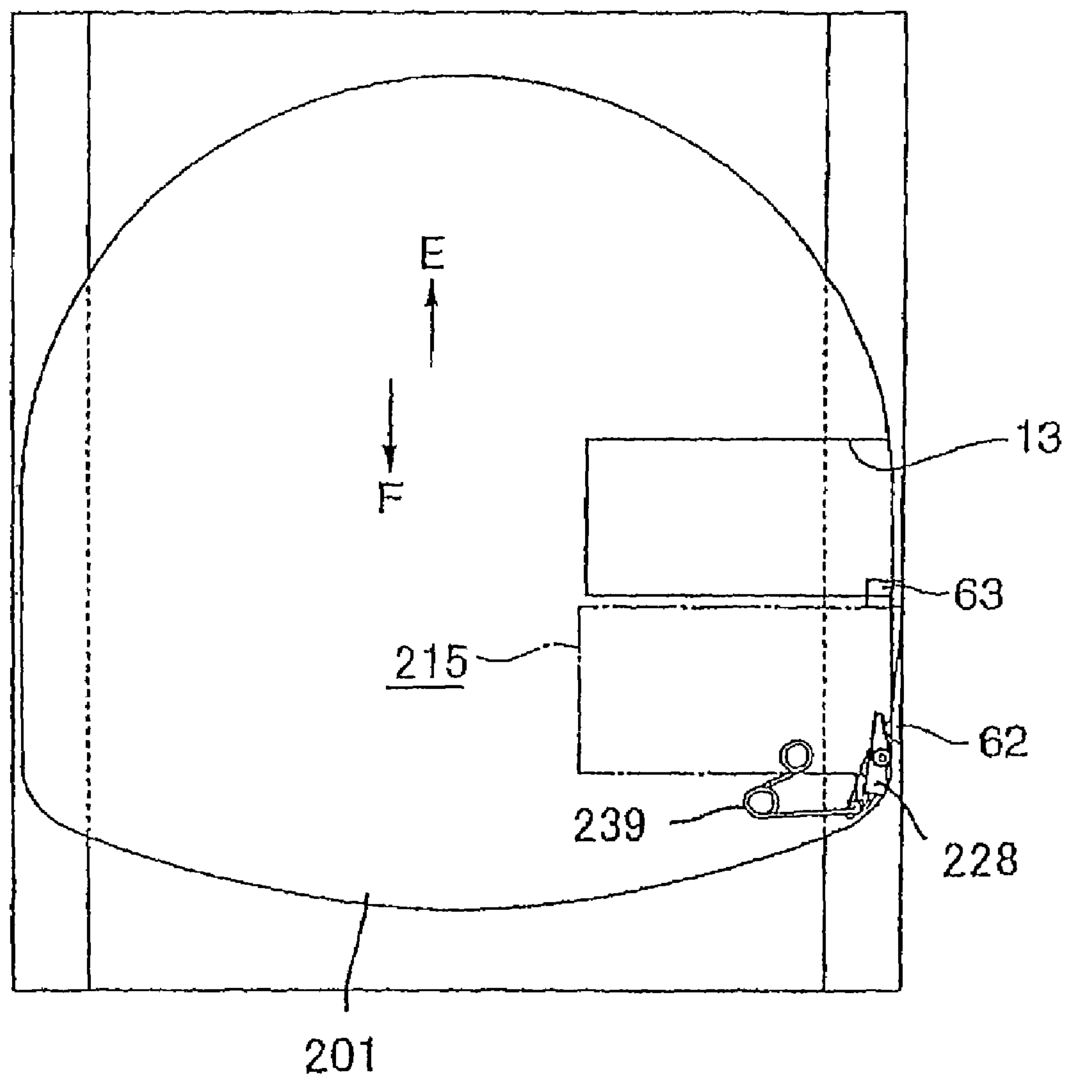
FIG. 28 is a plan view showing the state in which the disc cartridge has been inserted into a cartridge holder and the shutter unit has been moved to open the recording and/or reproducing aperture.

When inserted into the inside of the cartridge holder 254, until unlocking of the shutter unit 215, the shutter releasing piece 263 abuts against the lateral side of the shutter unit 215, to inhibit the movement of the shutter unit 215 relative to the main cartridge body unit 5, as shown in FIG. 27. When the disc cartridge 1 further intrudes from the position shown in FIG. 27 towards the inner part of the cartridge holder 254, in the direction indicated by arrow E, the main cartridge body unit 5 is moved along the direction as indicated by arrow E, thereby opening the aperture for the head part 13, as shown in FIG. 28.

If, as the movement of the shutter unit 215 is inhibited, the disc cartridge 201 is moved in the direction indicated by arrow E in FIG. 27, with the main cartridge body unit 5 then opening the aperture for the head part 13, the torsion coil spring 239, forming the shutter opening/closure unit 238, is biased, as described above with reference to FIGS. 19 and 20. When the main cartridge body unit 5 is moved in the direction indicated by arrow E in FIG. 27, such that the coil part 239_c_ surpasses the location of the support pin 242, lying along the direction of movement of the shutter unit 215, thus biasing the torsion coil spring 39, the biasing direction of the torsion coil spring 239 is reversed. The shutter unit 215 is then moved in the direction of arrow F in FIG. 27, opposite to the direction of movement of the main cartridge body unit 5, thus opening the aperture for the head part 13, as shown in FIGS. 11, 21 and 28. At this time, the shutter unit 215 is biased by the torsion coil spring 239 for opening the aperture for the head part 13, thus reliably retaining the aperture for the head part 13 in the opened state.

The disc cartridge 201, inserted into the cartridge holder 254, with the aperture for the head part 13 opened by the above-described operation, is loaded in position on the cartridge loading section, provided in the disc driving device 250. At this time, the optical disc 2 is loaded in position in a disc driving unit. This disc driving unit is then actuated to reproduce the program data recorded on the optical disc 2 to run the program.

For ejecting the disc cartridge 1, loaded on the disc driving device 250, after reproducing the optical disc 2, an ejection button 255 is pressed. On pressing the ejection button 255, the disc cartridge 1, loaded on the cartridge loading section, is ejected. After the ejection operation is carried out, the shutter unit 215 is moved relative to the main cartridge body unit 5 to revert to the initial position of closing the aperture for the head part 13 to lock the shutter unit 215 in this position of closing the aperture for the head part 13, by the reverse of the operation, described above. By this operation of restoring the shutter unit 215 to the closure position, the disc cartridge is ejected via the cartridge loading/unloading opening 253, so that the ejection of the disc cartridge 201, loaded on the disc driving device 250, comes to a close.

Figure 29:
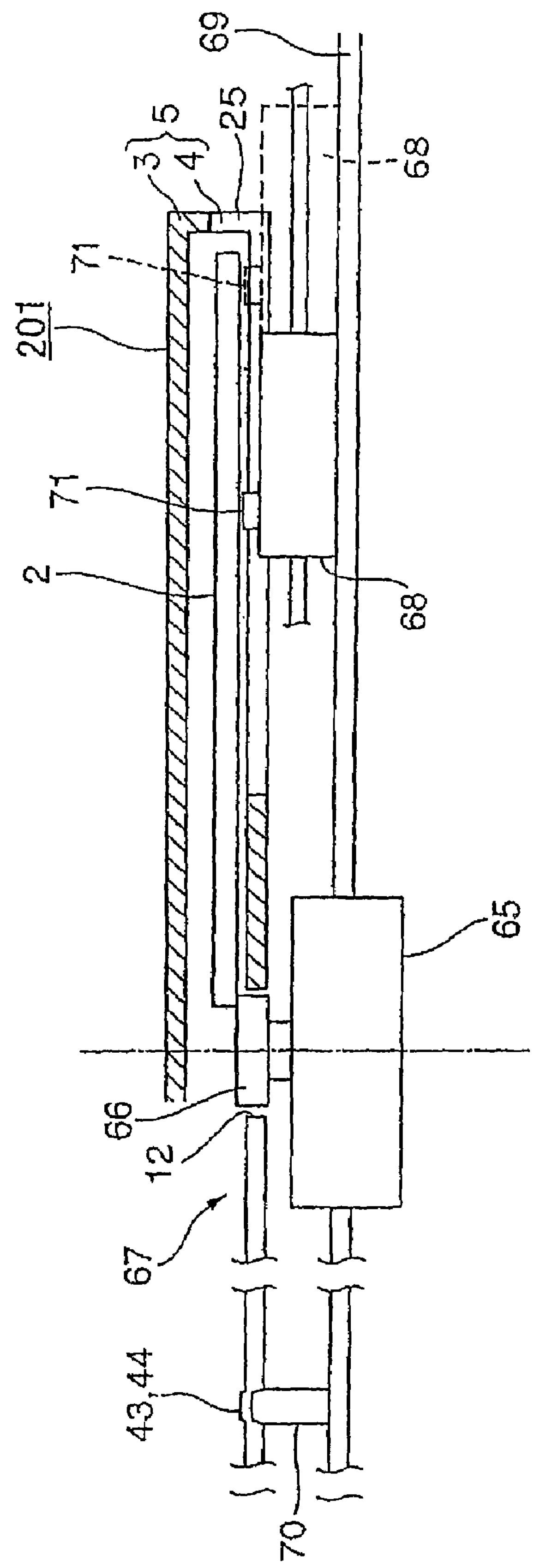
FIG. 29 is a plan view showing the state in which the disc cartridge has been loaded into a cartridge holder to reproduce the optical disc.
Figure 30:
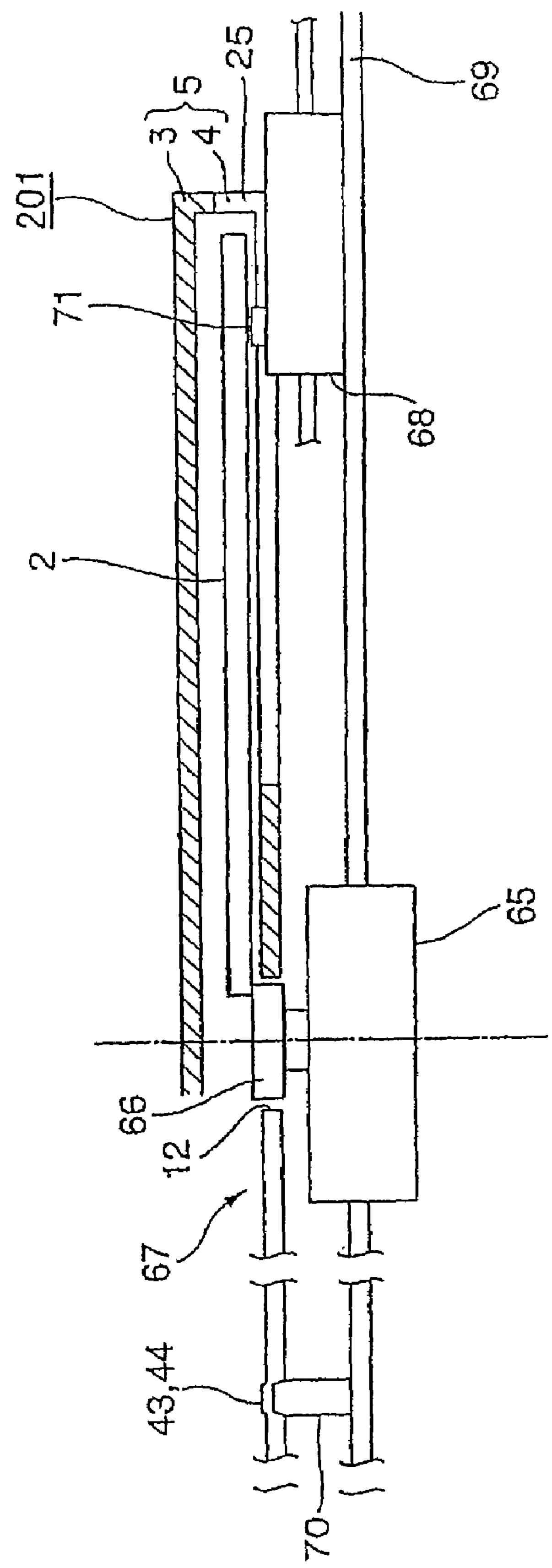
FIG. 30 is a cross-sectional side view showing the state in which an optical pickup has been moved to the outer rim side of the optical disc accommodated in the disc cartridge loaded on a cartridge loading section.

The state in which the disc cartridge 201 according to the present invention is loaded on the disc drive device 250 is further explained. The disc cartridge 201 is loaded on the cartridge loading section 67, provided in the main cartridge body unit 51, with the lower surface thereof as a loading surface, as shown in FIG. 29. In this lower surface of the disc cartridge, there is formed a disc driving opening 12 in which is inserted a turntable 66 forming the disc rotating driving unit 65 provided in the disc drive device 250.

Meanwhile, the cartridge loading section 67 is mounted on a base 69 carrying a disc rotating driving unit 65 and an optical pickup 68 for reproducing the data recorded on the optical disc 2. The cartridge loading section 67 is provided with a positioning pin 70 for positioning the disc cartridge 1 in the planar direction and a positioning lug, not shown, for positioning the disc cartridge 201 in the height-wise direction. The disc cartridge 201 is loaded on the cartridge loading section 67, as it is positioned in the planar and height-wise directions, by the positioning pin 70 engaging in each of the first and second positioning holes 43, 44 and by the lower surface being supported by the height positioning lug.

With the disc cartridge 201 of the present invention, the portion facing the aperture for the head part 13 of the upstanding peripheral wall section 4_a_ of the lower cartridge half 4 is formed with the cut-out 25 and thereby opened.

At least the portion facing the aperture for the head part 13 of the slide guide 18 carrying the shutter unit 215 provided to the upper cartridge half 3 is of a height $H_1$ not protruding from the lower surface 2_a_ of the optical disc 2 facing the lower cartridge half 4, as shown in FIG. 24, when the optical disc 2 in the disc cartridge 201, loaded in position in the height-wise direction on the cartridge loading section 67 has been loaded in position on the turntable 66.

The disc cartridge 201, constructed as described above, is able not only to locate an entire optical pickup 68, as a head part for reading out information signals, recorded on the optical disc, within the main cartridge body unit 5, as shown in FIG. 29, when the shutter unit 215 has been moved to open the aperture for the head part 13, but also to locate the components of the optical block 72, other than an objective lens 71, condensing the light beam, scanning the signal recording area of the optical disc 2, outwardly of the main cartridge body unit 5, as the objective lens 71 is located within the main cartridge body unit 5, as shown in FIG. 20, when the optical pickup 68 has been moved to a position scanning the outer rim of the optical disc 2.

As a result, with the disc cartridge 201, according to the present invention, the optical pickup 68 may be located at an optional position across the inner and outer rims of the main cartridge body unit 5, as the optical pickup is kept in proximity to the optical disc 2, and hence the signal recording area may be provided up to the outer rim of the optical disc 2, thus increasing the recording capacity of the optical disc 2. Moreover, since the optical pickup 68 may be located in proximity to the optical disc 2, the numerical aperture NA of the objective lens 71 may be increased, and hence the beam spot of the light beam condensed on the signal recording area of the optical disc 2 may be reduced, thereby improving the recording density of the information signals recorded on the optical disc 2. In addition, since the recording density may be improved with increase in the recording capacity, the optical disc 2 of a preset recording capacity may be reduced in size. The optical disc 2 may be scanned as the optical pickup 68 is located at an optional position across the inner and outer rims of the main cartridge body unit 5, the main cartridge body unit 5 and hence the recording and/or reproducing apparatus employing the disc cartridge 201 may be reduced in size.

The disc cartridge 201, described above, includes the shutter unit 215 for closing the aperture for the head part 13. However, the disc cartridge according to the present invention may also be devoid of the shutter member, with the aperture for the head part being then opened. With this disc cartridge, the portion of the upstanding peripheral wall section of the lower cartridge half, lying opposite to the aperture for the head part, is opened by being formed with the cut-out 25. That is, the portion of the aperture for the head part, extending from the inner rim up to the outer rim of the main cartridge body unit 5, is opened. The portion of the upstanding peripheral wall section, facing the entrance aperture for the head part, is also cut out.

When the present disc cartridge is loaded in position along the height-wise direction on the cartridge loading section in the disc recording and/or reproducing apparatus, the portion of the upper cartridge half facing the aperture for the head part and the entrance aperture for the head part is of a height $H_1$ not protruding from the lower surface 2*a* facing the lower cartridge half 4 of the optical disc 2, as in the case of the disc cartridge 201.

With this disc cartridge, the optical pickup may be positioned across the inner and outer sides of the main cartridge body unit, as the optical pickup is close to the optical disc, so that the signal recording area may be formed up to the outer rim of the optical disc, thereby increasing the recording capacity of the optical disc.

Although the disc cartridge having housed therein the replay-only optical disc has been explained in the foregoing, the present invention may similarly be applied to a recording and/or reproducing optical disc adapted for re-recording the information signals, or other types of the recording mediums, with comparable merits.

INDUSTRIAL UTILIZABILITY

Since the disc cartridge according to the present invention may be reduced in size, it may be used with advantage as a recording medium for a recording and/or reproducing apparatus reduced in size for portable use.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A disc cartridge comprising:

a disc;

a main cartridge body unit having said disc rotatably housed therein and including a recording and/or reproducing aperture for exposing a portion of said disc to outside across inner and outer rims of said disc, the recording and/or reproducing aperture defining a first side and a second side of the main cartridge body unit; and an entrance part for a head unit of a recording and/or reproducing apparatus, said entrance part being a recess which is formed in the first side of the main cartridge body unit and extending to said recording and/or reproducing aperture, for entrance of at least a portion of said head unit below an outer surface of the main cartridge body unit; wherein the portion of said recording and/or reproducing aperture along the outer rim of said main cartridge body unit is opened by being formed with a cut-out formed in a wall of the main cartridge body unit and extending in a direction along the thickness of said disc, and a depth of said entrance part is less than a thickness of a wall of the first side of said main cartridge body unit so as to not expose another portion of the disc located adjacent to the recess to the outside.

2. The disc cartridge according to claim 1 wherein said cut-out is formed to a height at least equal to a thickness of a surface of the main cartridge body unit.

3. The disc cartridge according to claim 1 wherein said cut-out is formed so that, when a recording and/or reproducing means of a recording and/or reproducing apparatus is introduced into said recording and/or reproducing aperture for recording and/or reproduction in the vicinity of the outer rim of said disc, part of said recording and/or reproducing means is located outside of said main cartridge body unit.

4. The disc cartridge according to claim 1 wherein the inserting lateral side of said main cartridge body unit into a recording and/or reproducing apparatus is a substantially semicircular arcuate section, having a center corresponding to a center of the disc housed in said main cartridge body unit, and wherein said recording and/or reproducing aperture is formed facing to a lateral side of said main cartridge body unit other than said inserting lateral side arcuate in profile.

5. The disc cartridge according to claim 4, wherein a lateral side of said main cartridge body unit opposing said inserting lateral side of said main cartridge body unit is a substantially semicircular arcuate section, having a radius larger than a radius of the substantially semicircular arcuate section of the inserting lateral side of said main cartridge body unit, wherein the lateral side of said main cartridge body unit into which said recording and/or reproducing apparatus is formed is a substantially linear section.

* * * * *